US011558168B2

(12) United States Patent
Kim et al.

(10) Patent No.: US 11,558,168 B2
(45) Date of Patent: Jan. 17, 2023

(54) PREEMPTION INDICATOR TECHNIQUES

(71) Applicant: Apple Inc., Cupertino, CA (US)

(72) Inventors: Yuchul Kim, Santa Clara, CA (US);
Wei Zeng, San Diego, CA (US);
Xiangying Yang, Cupertino, CA (US);
Haijing Hu, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/397,617

(22) Filed: Aug. 9, 2021

(65) Prior Publication Data

US 2021/0376991 A1    Dec. 2, 2021

Related U.S. Application Data

(63) Continuation of application No. 16/789,797, filed on Feb. 13, 2020, now Pat. No. 11,095,420, which is a
(Continued)

(51) Int. Cl.
*H04L 5/00* (2006.01)
*H04L 1/00* (2006.01)
(Continued)

(52) U.S. Cl.
CPC .......... *H04L 5/0094* (2013.01); *H04L 1/0043* (2013.01); *H04L 1/0045* (2013.01); *H04L 1/0048* (2013.01); *H04L 1/0058* (2013.01); *H04L 1/1812* (2013.01); *H04L 1/1829* (2013.01); *H04L 1/1854* (2013.01); *H04L 1/1864* (2013.01); *H04W 52/0206* (2013.01);
(Continued)

(58) Field of Classification Search
CPC .... H04L 5/0094; H04L 1/0045; H04L 1/0043
See application file for complete search history.

(56) References Cited

U.S. PATENT DOCUMENTS

2010/0034139 A1\* 2/2010 Love ............... H04L 1/0032
370/328
2011/0026622 A1    2/2011 Luo et al.
(Continued)

FOREIGN PATENT DOCUMENTS

CN    102498689 A    6/2012
CN    102656938 A    9/2012
(Continued)

OTHER PUBLICATIONS

3GPP; RP-1711505; 3GPP TSG RAN meeting #76, West Palm Beach, USA; Jun. 5-8, 2017; 218 pages.
(Continued)

*Primary Examiner* — Joseph D Torres
(74) *Attorney, Agent, or Firm* — Kowert, Hood, Munyon, Rankin & Goetzel, P.C.

(57) ABSTRACT

Techniques are disclosed relating to downlink control information for wireless communications. In some embodiments, the downlink control information includes code block group information that indicates which code block groups are transmitted and soft buffer handling information that indicates whether to flush previously-determined soft bits that correspond to one or more code block groups.

20 Claims, 16 Drawing Sheets

Related U.S. Application Data continuation of application No. 15/903,222, filed on Feb. 23, 2018, now Pat. No. 10,567,142.

(60) Provisional application No. 62/520,166, filed on Jun. 15, 2017, provisional application No. 62/500,556, filed on May 3, 2017, provisional application No. 62/475,399, filed on Mar. 23, 2017.

(51) Int. Cl.
  H04L 1/18 (2006.01)
  H04W 52/02 (2009.01)

(52) U.S. Cl.
  CPC .......... *H04L 1/1835* (2013.01); *H04L 1/1845* (2013.01); *H04L 5/001* (2013.01); *H04L 5/0007* (2013.01); *H04L 5/0023* (2013.01); *H04L 5/0055* (2013.01); *Y02D 30/70* (2020.08)

(56) References Cited

U.S. PATENT DOCUMENTS

| | | | |
|---|---|---|---|
| 2013/0010964 A1* | 1/2013 | Fong | H04L 5/0092 370/329 |
| 2015/0195818 A1 | 7/2015 | Davydov et al. | |
| 2016/0226643 A1* | 8/2016 | Mallik | H04L 1/1896 |
| 2017/0150424 A1 | 5/2017 | Lee et al. | |
| 2017/0332359 A1 | 11/2017 | Tsai et al. | |
| 2018/0227938 A1 | 8/2018 | Lee et al. | |
| 2018/0241416 A1 | 8/2018 | Axmon et al. | |

FOREIGN PATENT DOCUMENTS

| | | |
|---|---|---|
| CN | 106538012 A | 3/2017 |
| KR | 10-2012-0004543 A | 1/2012 |
| KR | 10-2016-0014003 A | 2/2016 |
| WO | 2011/020062 A2 | 2/2011 |
| WO | 2013/112292 A1 | 8/2013 |
| WO | 2017/167310 A1 | 10/2017 |

OTHER PUBLICATIONS

3GPP; RP-170377 38802-200; 3GPP TR 38.802 V2.0.0 (Mar. 2017); "3rd Generation Partnership Project; Technical Specification Group Radio Access Network; Study on New Radio (NR) Access Technology; Physical Layer Aspects (Release 14)"; Mar. 2017; 134 pages.
Samsung; "TB/CB Handling for eMBB"; 3GPP Draft; R1-1700958, 3rd Generation Partnership Project (3GPP), Mobile Competence Centre ; 650, Route Des Lucioles ; F-06921 Sophia-Antipolis Cedex ; France; vol. RAN WG1, No. Spokane, USA; Jan. 16, 2017; 6 pages.
LG Electronics; "Discussion on multiplexing of eMBB and URLLC fordownlink"; 3GPP Draft; R1-1702488 Discussion on Multiplexing of EMBB and URLLC for DL, 3rd Generation Partnership Project (3GPP), Mobile Competence Centre ; 650, Route Des Lucioles ; F-06921 Sophia-Antipolis Ced, vol. RAN WG1, no. Athens, Greece; Feb. 12, 2017; 8 pages.
Mediatek Inc: "URLLC and eMBB DL Multiplexing using CRC masking and multi- bit NACK feedback"; 3GPP Draft; R1-1702745_URLLC_and_EMBB_DL_Multiplexing_Using_CRC_Masking_and_Mul ti_Bit_Nack_Feedback, 3rd Generation Partnership Project (3GPP), Mobile Competence Centre 650, Route Des Lucioles; F-0, vol. RAN WG1, no. Athens; Feb. 12, 2017; 6 pages.
Fujitsu: "Discussion on Preemption Indicator for Multiplexing eMBB and URLLC in Downlink"; 3GPP Draft R1-1701920 Preemption Based Multiplexing for EMBB and URLLC, 3rd Generation Partnership Project (3GPP), Mobile Competence Centre; 650, Route Des Lucioles ; F-06921 Sophia-Antipolis Cedex, vol. Ran WG1, no. Athens, Greece; Feb. 6, 2017; 6 pages.
International Search Report and Written Opinion, Application No. PCT/US2018/020022, dated May 30, 2018, 14 pages.
Office Action for CN Application No. 201880011503.5, dated Apr. 20, 2020, 6 pages.
Notice of Allowance for Korean Patent Application No. 10-2019-7022240, Apple Inc., dated Jun. 3, 2020, 3 pages.
Notice of Allowance for Japanese Patent Application No. 2019-542729, Apple. Inc. dated Jun. 4, 2020, 8 pages.
Samsung; "Discussion on Partial Retransmission for eMBB"; 3GPP TSG RAN WG1 Meeting NR31 R1-1700959; Jan. 16-20, 2017; 4 pages.
Sequans Communications; "Preemption-based multiplexing of URLLC and eMBB in DL"; 3GPP TSG RAN WG1, R1-1702117 Meeting #88; Athens, Greece; Feb. 13-17, 2017; 5 pages.
Samsung; "Preemption-based multiplexing between eMBB and URLLC for DL"; 3GPP TSG RAN WG1 Meeting NR#1 R1-1700966: Spokane, USA; Jan. 20, 2017; 3 pages.
NTT Docomo, Inc.; "On dynamic multiplexing of eMBB and URLLC fordownlink"; 3GPP TSG RAN WG1 Meeting #88 R1-1702817; Athens, Greece; Feb. 17, 2017; 4 pages.
Samsung "CB-group based retransmission for eMBB"; 3GPP TSG RAN WG1 Meeting #88 R1-1702990; Athens, Greece; Feb. 13-17, 2017; 9 pages.
NTT Docomo, Inc. "CBG based (re)transmission, preemption indication and subsequent transmission in NR"; 3GPP TSG RAN WG1 Meeting #89 R1-1708384; Hangzhou, P.R. China; May 15-19, 2017; 8 pages.
LG Electronics "Discussion on multiplexing of eMBB and URLLC for uplink"; 3GPP TSG RAN WG1 Meeting #88 Athens, Greece; Feb. 13-17, 2017; 4 pages.
Examination Report for EP Patent Application No. 18 711 452.5-1205; dated Sep. 9, 2021.

* cited by examiner

Freq ↑ axes for Figs. 6A-6D
→ Time

No URLLC scheduled

URLLC preempts eMBB transmission, preemption indicator (PI) at end

Indicates time and/or frequency resource preempted

*URLLC preempts eMBB transmission, PI at same time*

*URLLC preempts eMBB transmission, PI both at same time and after*

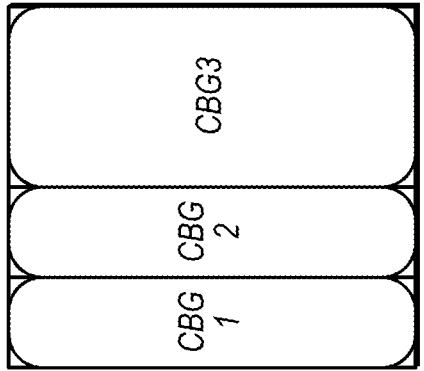
FIG. 14C
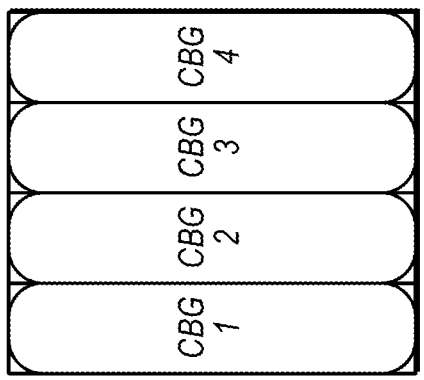
FIG. 14B
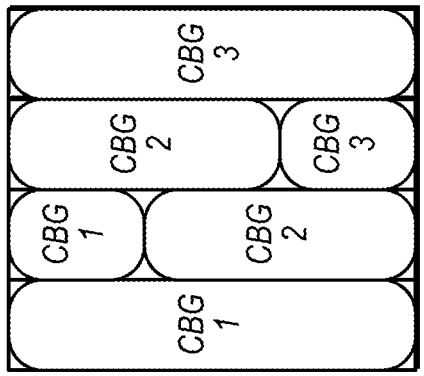
FIG. 14A
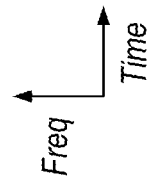

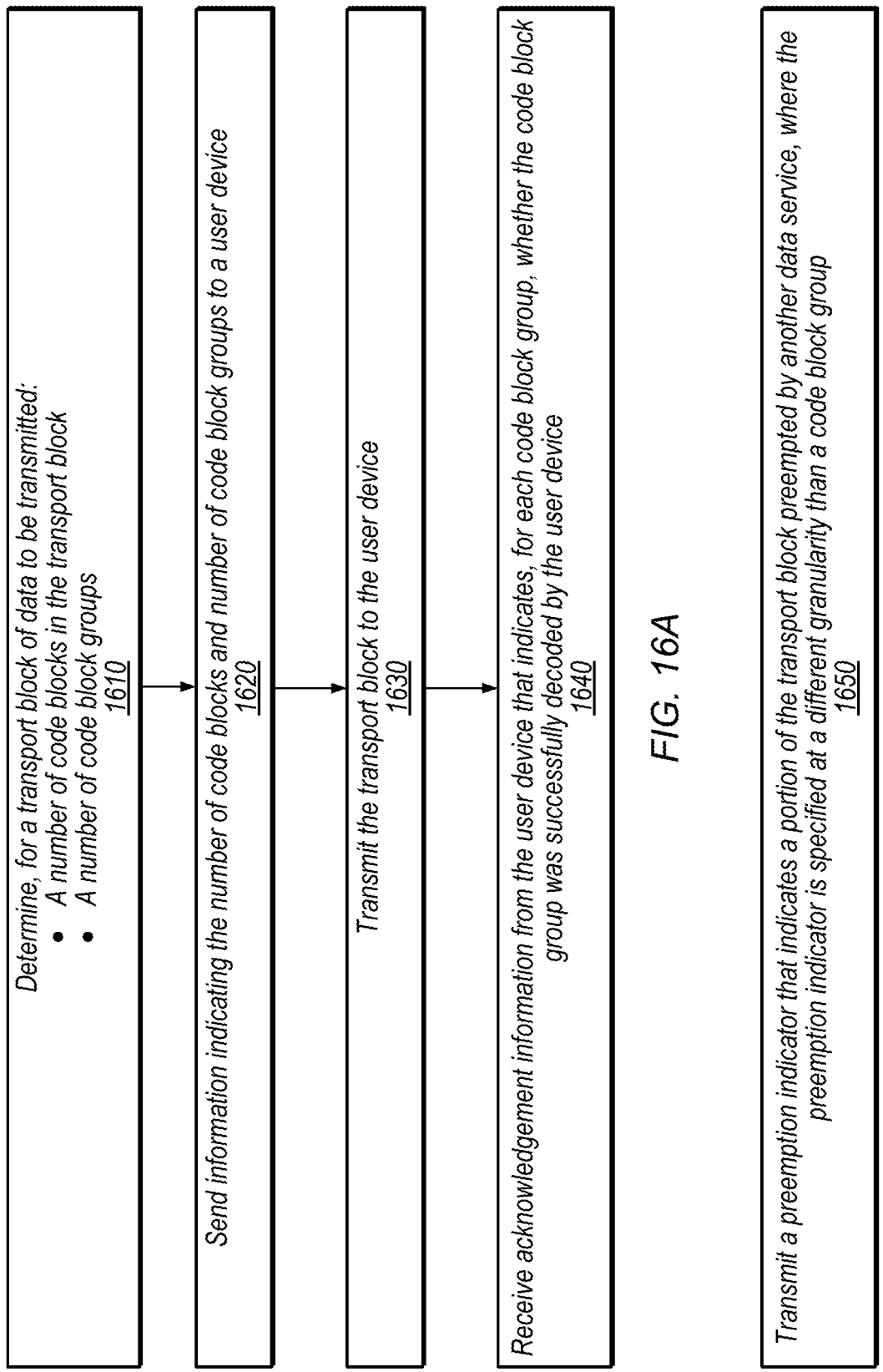

PREEMPTION INDICATOR TECHNIQUES

This application is a continuation of U.S. patent application Ser. No. 16/789,797, filed on Feb. 13, 2020, which is a continuation of U.S. patent application Ser. No. 15/903,222, filed on Feb. 23, 2018. The '222 application claims the benefit of U.S. Provisional Application No. 62/475,399, filed on Mar. 23, 2017; U.S. Provisional Application No. 62/500,556, filed on May 3, 2017; and U.S. Provisional Application No. 62/520,166, filed on Jun. 15, 2017. The disclosures of each of the above-mentioned applications are incorporated by reference herein in their respective entireties.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to techniques for multiplexing different cellular services on shared physical layer frames.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

For some wireless communications standards, such as the 5G air interface physical layer design for example, various different types of services are being proposed. For example, an enhanced mobile broadband (eMBB) service may provide high-rate data service with a latency requirement (e.g., 4 ms) and an ultra reliable low latency (URLLC) service may provide highly reliable service with a lower latency requirement (e.g., 0.5 ms) than eMBB. Speaking generally, different services that use a unified physical layer framework may have very different natures in terms of reliability, latency, data rate, etc. Accommodating such different services while maintaining performance, low complexity, and low power consumption (e.g., both at the base station and mobile devices) may be challenging.

SUMMARY

In some embodiments, partitions are specified for radio frames, where preemption of one data service by another data service is allowed in specified partitions. In some embodiments, RRC, DCI, or dedicated frequency signaling may be used to specify time and/or frequency resources in which preemption is allowed. The partitions may be changed dynamically, in some embodiments.

In some embodiments, a base station may attempt to schedule transmission for a low-latency data service without preemption, e.g., in unused time/frequency blocks. In some embodiments, when preemption of transmission for one data service by another data service actually occurs, a preemption indicator is transmitted that indicates the time and/or frequency resources in which preemption occurred. This may allow a UE to successfully decode the preempted data service, in some instances and/or may reduce blind decoding by mobile devices. The preemption indicator may be mobile-device-specific or common to multiple mobile devices. In some embodiments, a preemption indicator is transmitted at the same time preemption is occurring. In some embodiments, a preemption indicator is transmitted at a negotiated portion of a radio frame or a predetermined portion of a radio frame. In some embodiments, a preemption indicator is transmitted using a dedicated frequency band. In some embodiments, multiple preemption indicators are used, e.g., a first indicator to specify time resources and a second indicator to specify frequency resources.

In some embodiments, a base station and mobile device are configured to communicate using one or more of three scenarios for preemption. In the first case, the base station transmits both a retransmission and a preemption indicator after receiving acknowledgement signaling from the mobile device for preempted data. In the second case, the base station transmits the preemption indicator before the acknowledgement signaling and transmits the retransmission after the acknowledgement signaling. In the third case, the base station transmits both the retransmission and the preemption indicator before receiving acknowledgement signaling from the mobile device for preempted data.

In the first and third cases, the base station may encode downlink control information and the preemption indicator in combination. In the first and third cases, the preemption indicator may be UE-specific, while the preemption indicator may be common in the second case. In some embodiments, acknowledgement signaling may include combined acknowledgement data for the preempted transmission and for a retransmission, and acknowledgement signaling may be rescheduled. In some embodiments, acknowledgement signaling includes separate indications for different portions of a transport block of the preempted signal, e.g., for different code block groups.

In some embodiments, a base station and UE implement code-block-group (CBG)-based HARQ retransmission techniques, such that the UE specifies ACK information at the CBG granularity. The base station may use RRC signaling to semi-statically configure CBG-based HARQ for the UE. The base station may retransmit only CBGs that the UE indicates were not successfully decoded. In some embodiments, the base station is configured to align CBGs with frequency-division-multiplexing (FDM) symbols.

The base station may determine a maximum number of CBGs supported by the particular UE and, for a given transport block, determine (1) a number of CBGs in the transport block and (2) a number of code blocks (CBs) per CBG based on the size of the transport block and the maximum supported number of CBGs. The base station may also adjust the grouping of CBs into CBGs for retransmissions (e.g., by splitting CBs of a CBG into multiple CBGs if only a portion of CBGs in the transport block are being retransmitted). Downlink control information from the base station may indicate one or more of: a HARQ process ID, an indication of whether the transmission is for a new TB, resource allocation for transmission, a modulation and coding scheme index, redundancy version, a bitmap of which CBGs are transmitted, and/or soft buffer handling information bits (which may be common or CBG specific). CBG information may be combined with a preemption indicator to pinpoint resources preempted by another data service (e.g., URLLC).

BRIEF DESCRIPTION OF THE DRAWINGS

A better understanding of the present subject matter can be obtained when the following detailed description of the embodiments is considered in conjunction with the following drawings, in which:

FIGS. 14A-14C illustrate different distributions of code block groups across OFDM symbols, according to some embodiments.

FIGS. 16A-16B are flow diagrams illustrating techniques for CBG-based acknowledgements and a preemption indicator at another granularity, according to some embodiments.

Figure 1:
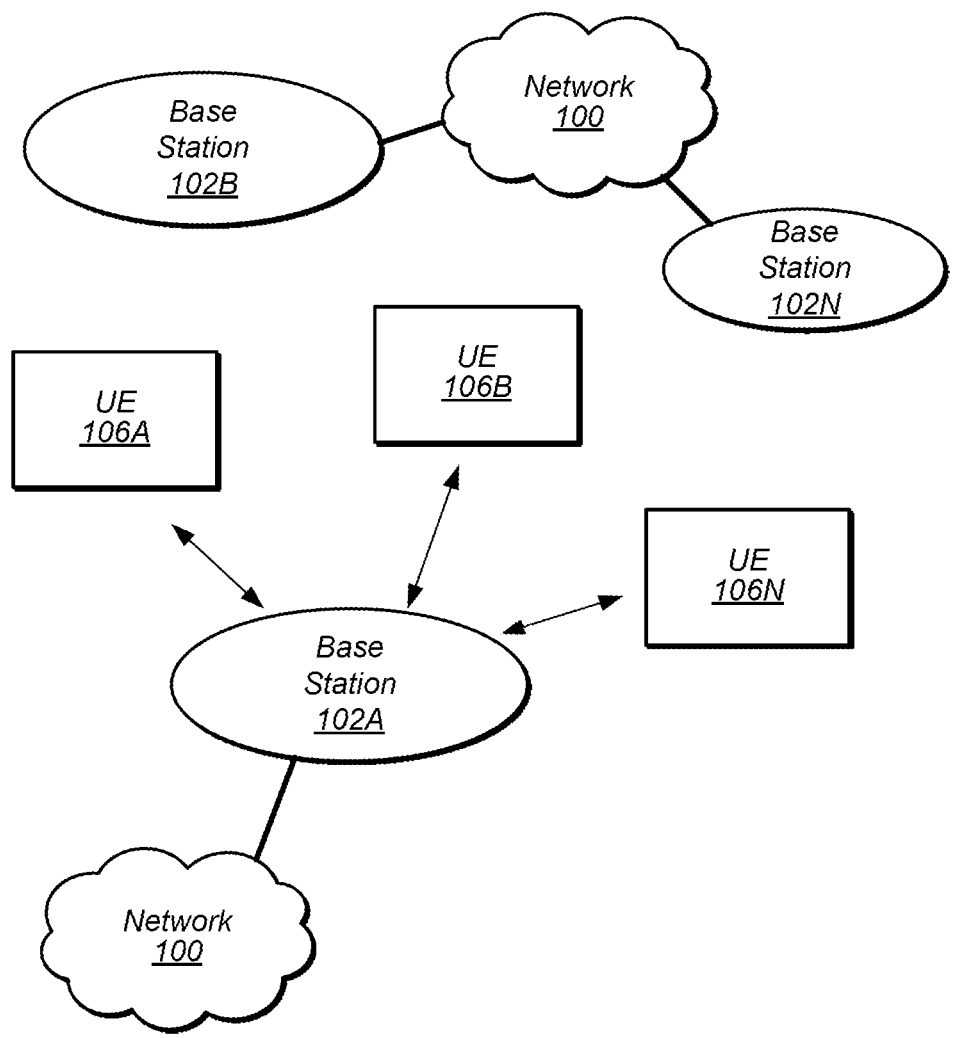
FIG. 1 illustrates an exemplary (and simplified) wireless communication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Acronyms

The following acronyms may be used in the present disclosure.

3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function
PGW: Packet Gateway
PER: Packet Error Rate
QCI: Quality of Service Class Index
QoS: Quality of Service
RAT: Radio Access Technology
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
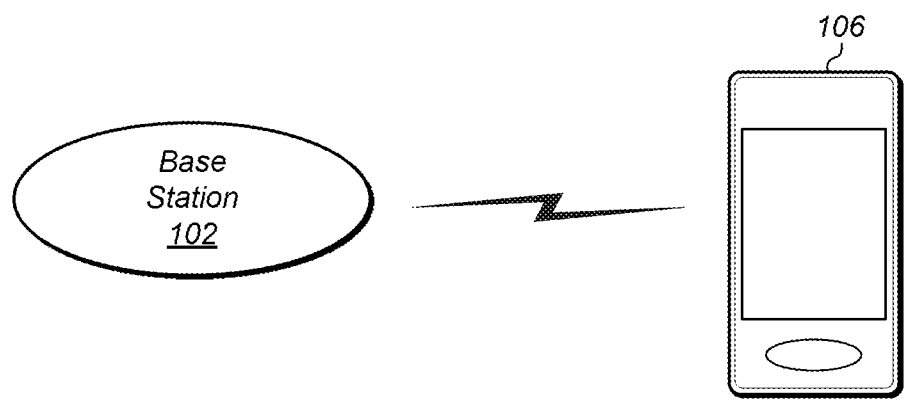
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
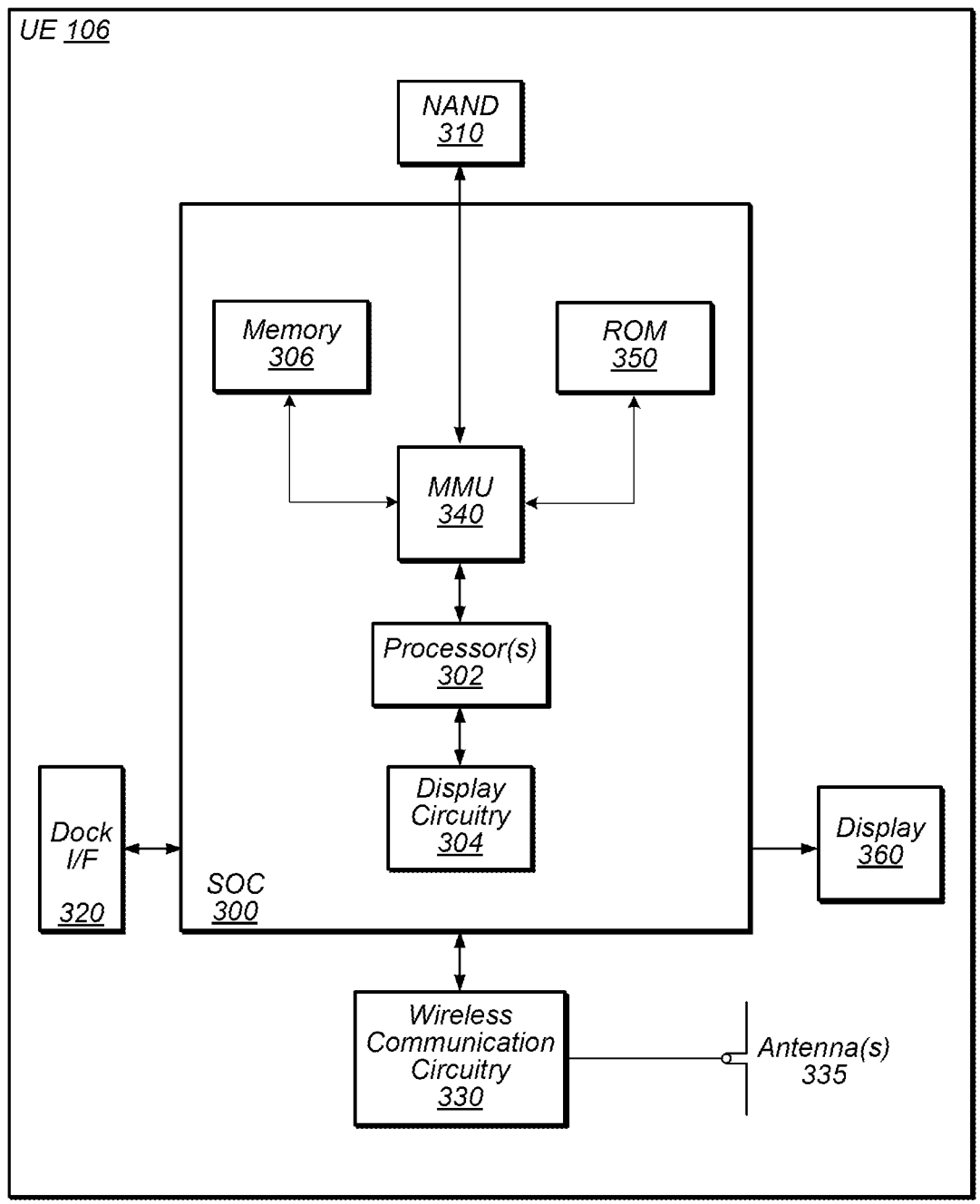
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
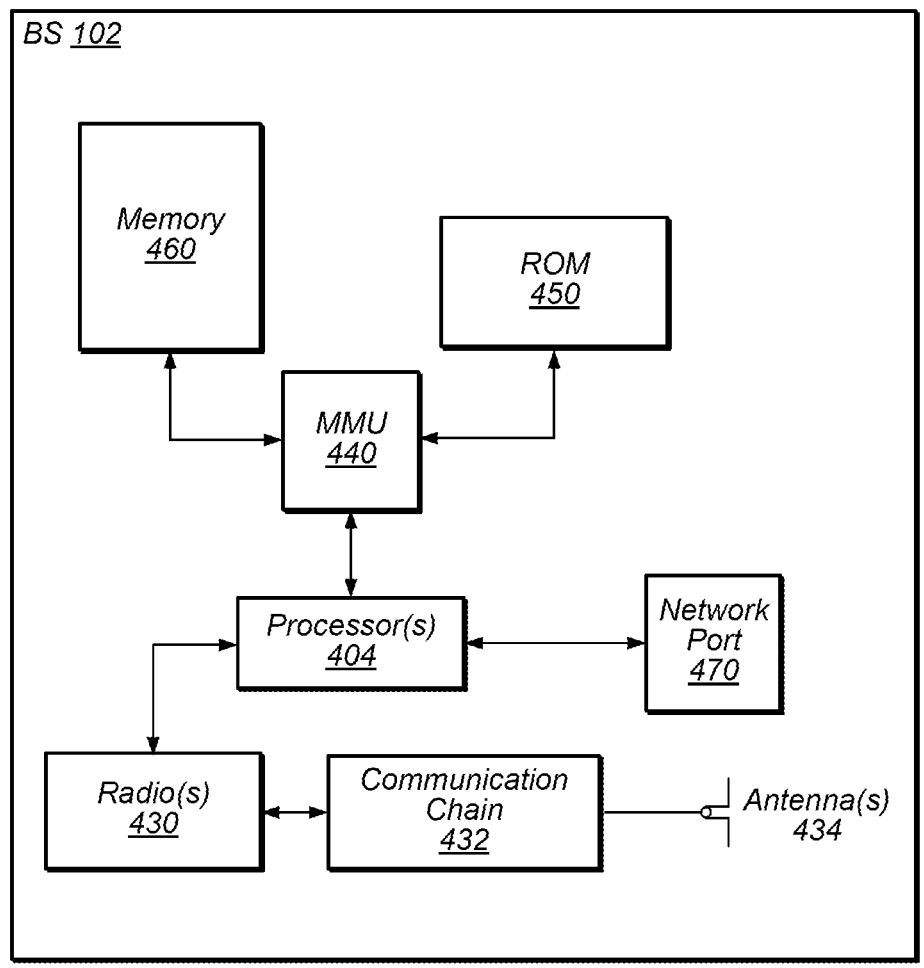
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Overview of Service Multiplexing Techniques

In various embodiments, it may be challenging to support data services with different characteristics in a unified physical layer framework, while still maintaining performance, low complexity, and low power consumption. For example URLLC signaling with a very low latency requirement may need to be scheduled when an eMBB transmission is ongoing, in order to achieve the target latency (e.g., waiting for the eMBB transmission to finish may take longer than the greatest amount of latency allowed for URLLC). Therefore, in various embodiments, multiplexing techniques are used to share physical layer time and frequency resources between different services. URLLC and eMBB are discussed herein for purposes of illustration, but are not intended to limit the scope of the present disclosure; the disclosed techniques may be utilized between any of various different data services.

Speaking generally, if there are unused time and/or frequency resources during eMBB transmissions, a base station may be configured to schedule URLLC transmissions using the empty resources such that they do not affect other data transmission. If unused resources are not available, in some embodiments URLLC may be allowed to preempt eMBB transmission, which may meet URLLC latency requirements but may contaminate eMBB data and degrade performance of eMBB packets (e.g., degrading block error rate (BLER)). Handling this contamination may be important for overall performance and power consumption.

Exemplary Soft Partitioning

In some embodiments, resource partitioning may be used to specify what resources are available to different services. For example, some resources may be URLLC only, other resources eMBB only, and other resources may support eMBB but allow preemption by URLLC.

In some embodiments, resources are divided into two parts: a first portion where URLLC preemption is permitted and a second portion where it is not. In some embodiments, a bit for each portion may indicate whether or not preemption is permitted (or some other encoding may be used to indicate each partition's status). The division may be temporary, e.g., it may last for a specified time interval and then may be changed to another division of resources between preemption-allowed and no-preemption.

For frequency resources, signaling at a higher layer in the protocol stack (e.g., RRC signaling) may be used, for example, to indicate portions of the spectrum in which URLLC preemption is allowed. The indication of where preemption is allowed may be performed on a per-physical resource block (PRB) granularity, a per-sub-band granularity, or at any of various appropriate divisions of frequency spectrum. The base station may then use only the indicated resources for preempting URLLC transmissions and mobile devices may handle decoding failures in resources that allow preemption differently (as discussed in further detail below). In some embodiments, RRC signaling also indicates how long the partitioning of resources between preemption-allowed and no-preemption is valid.

For time resources, a downlink control information (DCI) field or a separate channel may be used, for example, to indicate intervals in which URLLC preemption is allowed. A DCI indication may be used for per-mobile-device indications while a separate channel may be used for common signals to multiple mobile devices. The indication of where preemption is allowed may be performed on an OFDM symbol granularity, a mini-slot granularity, a slot granularity, a subframe granularity, a frame granularity, or at any of various appropriate divisions of time.

Although DCI, separate channel, and RRC signaling techniques are provided as examples of signaling, other layers, fields, channels, etc. may be used alone or in combination, in various embodiments, to indicate resources in which preemption of one service by another service is allowed. For example, in some embodiments, RRC may be used to indicate time resources and DCI may be used to indicate frequency resources. In some embodiments, both RRC and DCI together may be used to indicate time and frequency resources.

Figure 5A:
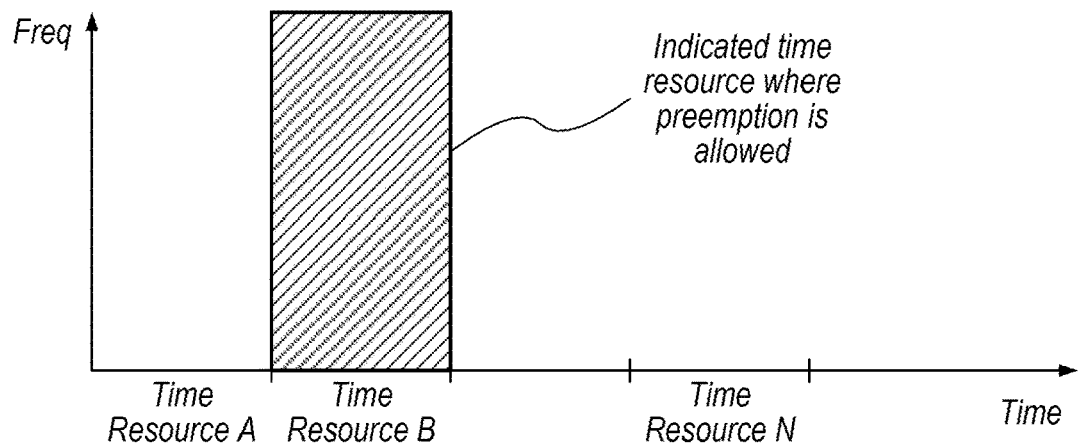
FIGS. 5A-5B illustrate exemplary indications of time and frequency resources in which preemption of a first data service by a second data service is allowed, according to some embodiments.
Figure 5B:
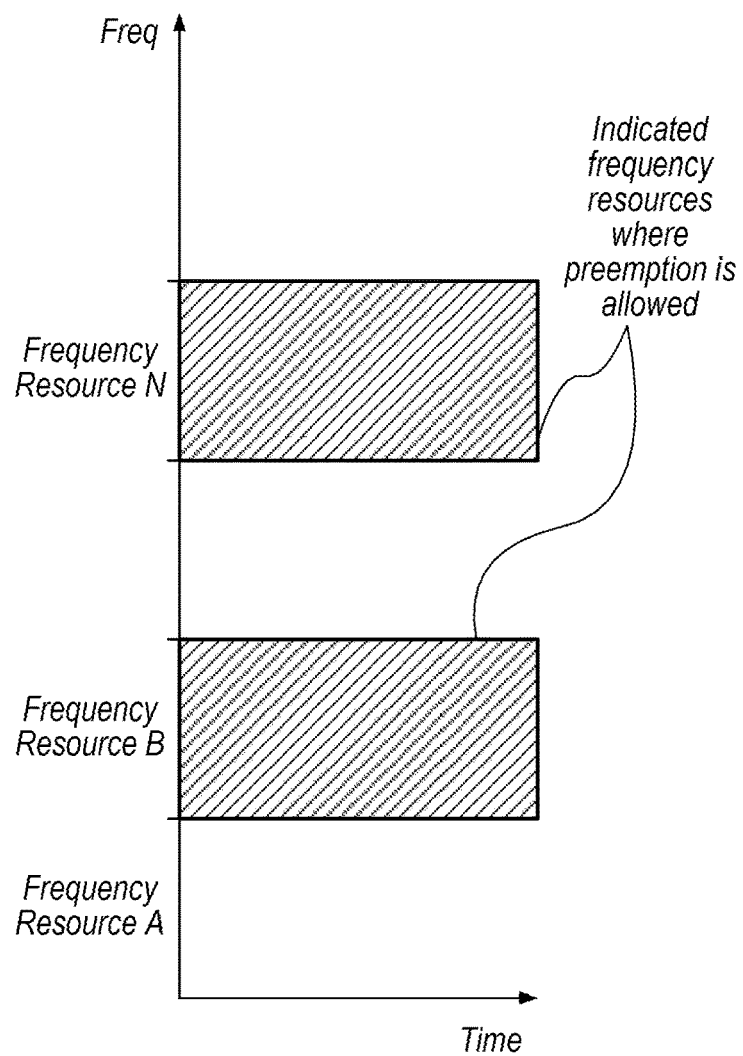

FIG. 5A is a diagram illustrating an exemplary group of time resources A-N. In the illustrated embodiment, time resource B is indicated as a resource in which preemption is allowed. FIG. 5B is a diagram illustrating an exemplary group of frequency resources A-N. In the illustrated embodiment, frequency resources B and N are indicated as resources in which preemption is allowed. Note that one or the other of frequency and time resources may be indicated, or both may be indicated to delineate a portion of the overall time-frequency resources available. If the indications of FIGS. 5A and 5B are combined, then preemption may be allowed only in time resource B at frequencies B and N. In another technique for combining indications, preemption would be allowed at all frequencies B and N (even during time intervals other than time B) and at all frequencies during time resource B. Therefore, different indicators may be combined in different ways in different implementations.

Exemplary Preemption Indicator Techniques

FIGS. 6A-6D illustrate exemplary techniques for indicating what resources have been used for preemption, according to some embodiments. As shown, the vertical axis represents frequency and the horizontal axis represents time, in these figures.

Figure 6A:
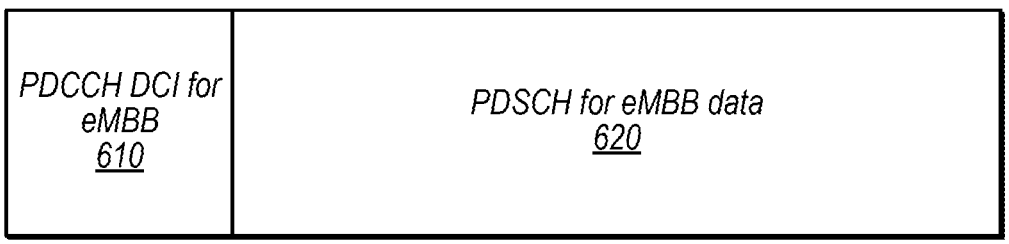
FIGS. 6A-6D illustrate exemplary preemption indicators for specifying time and/or frequency resources in which the second data service preempts the first data service, according to some embodiments.

In FIG. 6A, no URLLC is scheduled. Note that this may be the case even when preemption is allowed, e.g., because URLLC transmission is not needed. In the illustrated embodiment, a physical layer frame includes a Physical Downlink Control Channel (PDCCH) DCI portion 610 for eMBB transmission and a Physical Downlink Shared Channel (PDSCH) portion 620 for the eMBB transmission data. Note that, in various embodiments, the PDCCH 610 may not necessarily align in the frequency domain with eMBB data transmission 620, although it is shown aligned in FIG. 6A for purposes of illustration.

Figure 6B:
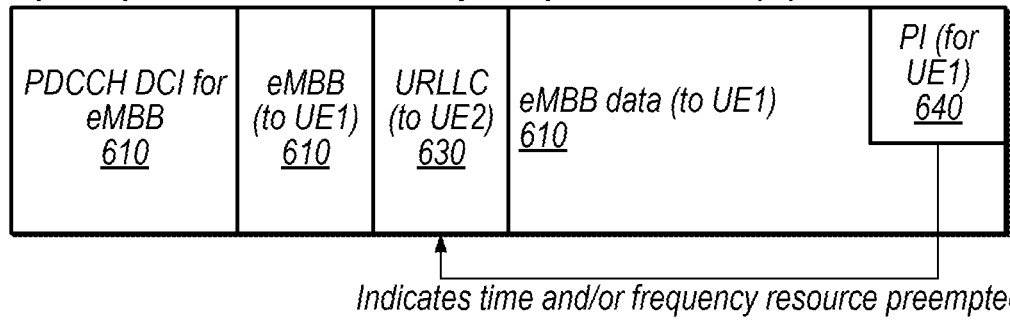

In FIG. 6B, URLLC preempts a portion of the eMBB transmission in a physical layer frame. In the illustrated embodiment, a preemption indicator (PI) 640 is sent at the end of the frame and indicates the location of the URLLC preemption 630. The PI 640 may indicate time resources and/or frequency resources preempted. In the illustrated embodiment, the URLLC signaling is for a mobile device UE2 that is different from a mobile device UE1 for the eMBB data. Therefore, the PI 640 may be used by UE1 to properly decode the eMBB data during preemption (e.g., by removing contaminated data due to the URLLC preemption, as discussed in further detail below).

In some embodiments, PI 640 is UE-specific, e.g., such that it is only used by UE1 in the illustrated example. In other embodiments, PI 640 is UE-common and specifies that preemption occurred for multiple UEs. Note that PI 640 may be located in a known location, which may be fixed (e.g., for UE-common) or negotiated (e.g., UE-specific). For example, UE-specific PI may be sent in the last N bits (e.g., before de-interleaving), last OFDM symbol, or in a pre-specified set of subcarriers in the last OFDM symbols of the time-frequency resources assigned to the mobile device. UE-common PI may be sent in pre-defined time-frequency resources which all mobile devices may monitor. Although PI 640 is shown at the end of the PDSCH, it could be located at the beginning, or at any other appropriate location within the frame, in various embodiments.

Figure 6C:
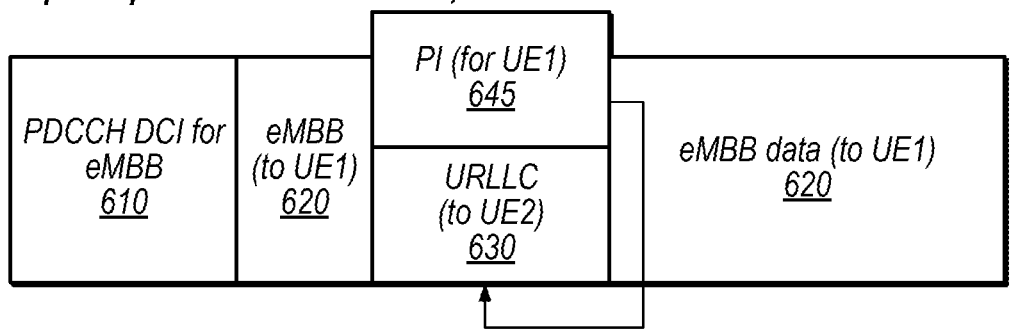

In FIG. 6C, URLLC preempts a portion of the eMBB transmission in a physical layer frame and a PI 645 is transmitted at the same time as the preemption. In some embodiments, PI 645 indicates the time interval in which preemption is occurring but does not specify what frequency resources are used for the preemption (e.g., preemption may be assumed across the entire frequency band or may be specified by another PI). In other embodiments, PI 645 indicates both the time and frequency resources preempted. Transmitting a PI at the same time as the preemption may avoid unnecessary blind decoding by a mobile device (e.g., because the mobile device knows in real time when preemption is occurring). The PI could be transmitted within the frequency resources of the eMBB PDSCH or using separate resources. For example, in some embodiments PIs are transmitted using a reserved PI channel in a different frequency band than the service being preempted (e.g., in these embodiments, referring the example of FIG. 6C, the PI 645 would not overlap in frequency with the PDSCH 620).

Figure 6D:
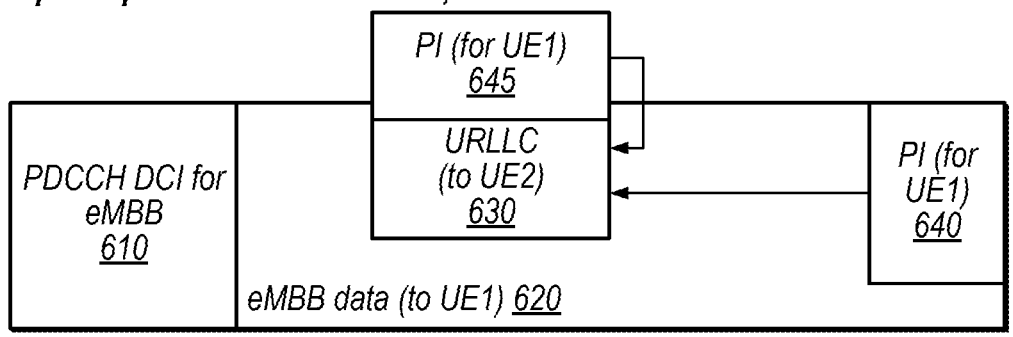

In FIG. 6D, URLLC preempts a portion of the eMBB transmission in a physical layer frame and PIs are transmitted both at the same time as the preemption (PI 645) and after the preemption (PI 640). PI 645 may be transmitted within the frequency resources of the eMBB PDSCH or using separate resources. In some embodiments, PI 645 indicates the time resources preempted and PI 640 indicates the frequency resources preempted. In some embodiments, PI 645 is common for multiple UEs while PI 640 is UE-specific. This may reduce the amount of resources needed for common data (e.g., because a binary indication of whether preemption is occurring or not may be implemented for PI 645), which may improve overall efficiency. In some embodiments, PI 645 (or PI 640) indicates both time and frequency resources.

Figure 7:
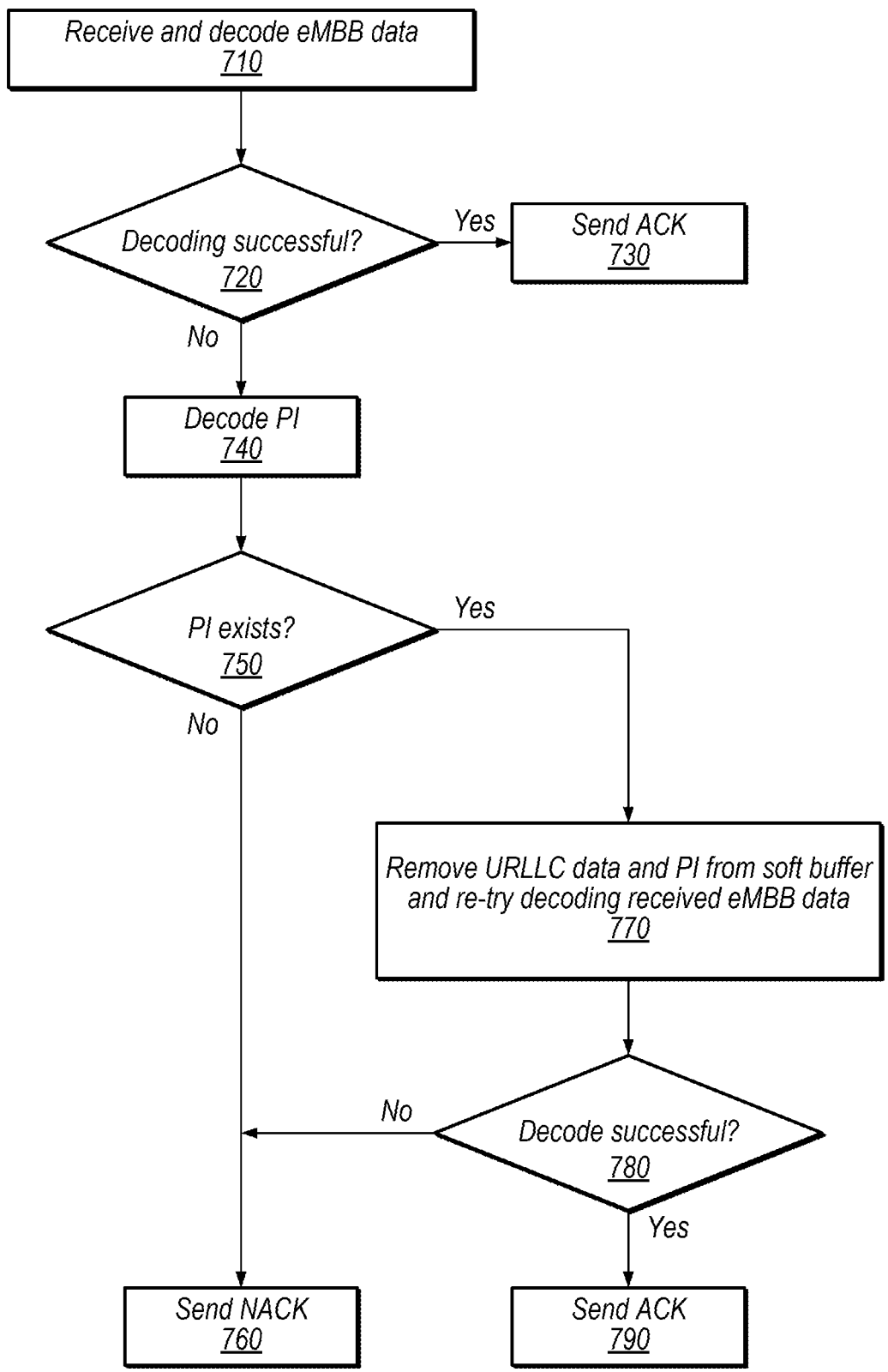
FIG. 7 is a flow diagram illustrating an exemplary method for a mobile device to decode data when preemption occurs, according to some embodiments.

FIG. 7 is a flow diagram illustrating a method for decoding received data in the presence of preemption among data services, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, UE 106 receives and decodes eMBB data transmitted by a base station. For example, UE 106 may decode PDSCH 620. In some embodiments, UE 106 is configured to use a forward error correction (FEC) code such as a turbo code to decode the eMBB data, which may include using a buffer of "soft" indications of the likelihood that bits in the data stream are zeros or ones.

At 720, in the illustrated embodiment, UE 106 determines whether decoding is successful. For example, decoding may be unsuccessful if errors are detected that cannot be corrected. In some situations, decoding may fail because of preemption by URLLC. In these situations, UE 106 may be able to successfully decode if it has knowledge of the URLLC preemption. If decoding is successful, in the illustrated embodiment, UE 106 sends at acknowledgement (ACK) to the base station at 730. If decoding is unsuccessful, in the illustrated embodiment, UE 106 proceeds to 740 and decodes the preemption indicator.

Note that, in some embodiments, UE 106 may simply proceed to 760 and send a NACK to the base station if it determines that preemption is not allowed using the resources in which the decoding failure occurred. For example, referring back to FIGS. 5A-5B, UE 106 may send a NACK if decoding fails in time and/or frequency resources where preemption is indicated as not being allowed. In these embodiments, if the failure occurs in resources where preemption is allowed, flow may proceed to 740 as shown.

At 750, in the illustrated embodiment, UE 106 determines whether the preemption indicator exists in the received signal. For example, the UE may determine whether there is a PI using a cyclic redundancy check (CRC). Depending on the implementation, UE 106 may look for a PI in a number of locations, e.g., a PI similar to PI 645, a PI similar to 640, or both, as discussed with reference to FIGS. 6A-6D. If a PI is detected, in the illustrated embodiment, flow proceeds to 770. Otherwise, flow proceeds to 760 and UE 106 sends a NACK to the base station. The base station may then send a repetition of the failed data in response to the NACK.

At 770, in the illustrated embodiment, UE 106 removes data contaminated by URLLC and removes PI data from a soft buffer and re-tries decoding of the received eMBB data. Although soft decoding is discussed herein, it is not intended to limit the scope of the present disclosure. In other embodiments, any of various techniques may be used to re-try decoding based on knowledge of the PI location and the information specified by the PI.

In some embodiments, UE 106 is configured to re-try decoding at 770 only if the resulting effective code rate after removal of URLLC and PI is less than one. Otherwise, UE 106 may simply proceed to 760 and send a NACK. This may save power consumption by avoiding re-trying decoding when it is unlikely to succeed.

At 780, in the illustrated embodiment, UE 106 determines whether the re-try decoding was successful. If so, UE 106 sends an ACK to the base station at 790, otherwise UE 106 sends a NACK to the base station at 760.

Exemplary Preemption Indicator Formats

In various embodiments, PI information may take a number of different forms, non-limiting examples of which are discussed below. For indicating time resources, a PI may specify: a starting OFDM symbol number and ending OFDM symbol number, a starting OFDM symbol number and a number of OFDM symbols preempted, a list of OFDM symbol set indices (e.g., a bit for each symbol indicating whether or not preemption occurred for that symbol), a starting mini-slot number and ending mini-slot number (where a mini-slot refers to a number of contiguous OFDM signals such that an integer number of mini-slots are included in a slot or sub-frame), a set of code block numbers that are preempted, a starting code block number and ending code block number, a starting code block number and number of code block numbers preempted, a set of code block group numbers that are preempted, a starting code block group number and ending code block group number, a starting code block group number and number of code block group numbers preempted, etc.

For indicating frequency resources, a PI may specify: a starting PRB number and number of PRBs preempted, a starting PRB number and ending PRB number, a starting subcarrier number and ending subcarrier number, sub-band number, etc.

In some embodiments, the PI may indicate the location of the PDCCH used to schedule the preemption URLLC traffic. This PDCCH may indicate the exact time-frequency resources used for the URLLC transmission, so UE 106 may use the information in the URLLC PDCCH to determine the preempted resources. The PDCCH location may be indicated using various information (e.g., the various formats discussed above), such as OFDM symbol indices, for example. In some implementations, the PDCCH used for URLLC may not be accessible to other UEs and therefore the other formats discussed above may be used.

In other embodiments, URLLC preemption may occur without any indication to the UE of what resources are being preempted (e.g., PIs may not be transmitted). In these embodiments, various techniques may be used to overcome performance degradation to eMBB due to URLCC preemption. For example, hybrid automatic repeat request (HARM) retransmissions may be used or UE 106 may be configured to detect occurrence of preemption blindly (e.g., based on modulation order difference, modulation type difference, phase rotations, etc. during preemption).

In various embodiments, however, the disclosed techniques for indicating when preemption occurs may improve decoding performance and reduce power consumption at the UE 106 and/or the base station, relative to blind decoding or retransmissions, for example, while achieving the latency requirements of a low-latency data service such as URLLC.

Exemplary Code Block Group and Acknowledgement Techniques

Figure 8:
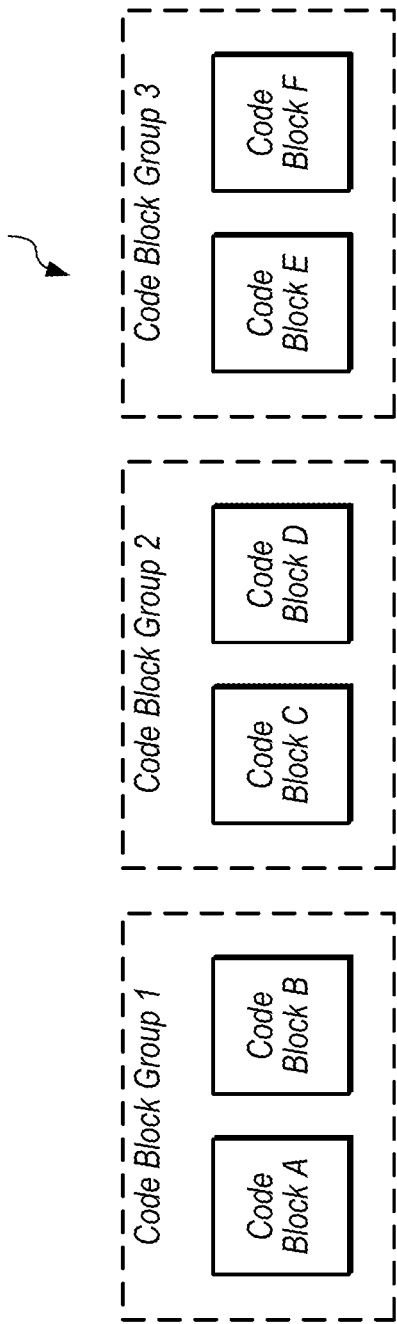
FIG. 8 is a diagram illustrating exemplary code block grouping techniques, according to some embodiments.

FIG. 8 is a block diagram illustrating exemplary code block grouping, according to some embodiments. In some embodiments, when a transport block (TB) of data to be transmitted from the base station to the UE is greater than a threshold size, the base station is configured to segment the transport block into multiple code blocks (CBs) and may then group the code blocks into code block groups (CBGs).

In the illustrated example, a transport block is split into six code blocks A-F. In this example, the code blocks are grouped into three code block groups: code blocks A and B are grouped into CBG1, code blocks C and D are grouped into CBG2, and code blocks E and F are grouped into CBG3.

In some embodiments, the UE is configured to send separate acknowledgement signals for each code block group. For example, the UE may generate a bit for each CBG that indicates whether or not the CBG was successfully decoded. In some embodiments, this may allow the base station to retransmit less than the entirety of a transport block, e.g., by only retransmitting code block groups that failed. In the illustrated embodiment, acknowledgement signals 850 include a separate ACK bit for each CBG.

Note that different code block groups may or may not have different numbers of code blocks and code blocks may or may not have different sizes, in various embodiments. Further, acknowledgment signals may be communicated at various other granularities within a transport block than shown, in other embodiments.

Speaking generally, when the base station 102 schedules a time-frequency resource to send eMBB data to a UE, it may divide the resource into sub-resources in the time domain. The sub-resources may or may not be equally sized. The sub-resources may include one or more mini-slots or one or more OFDM symbols, for example. Each sub-resource may carry encoded bits for a single code block group. In some embodiments, UE 106 is configured to send an acknowledgment bit for each sub-resource base to base station 102.

Control information at the code block group level may be particularly useful for URLLC preemption, which is typically wideband for a short amount of time. Therefore, URLLC preemption may typically affect a relatively small number of code block groups and segmentation of control information to indicate resources in the time dimension may be advantageous. In other embodiments, however, similar techniques may be used to acknowledge receipt of different frequency portions of a signal.

Exemplary Embodiments for Preemption Indicator and Retransmission Timing

In various embodiments, a preemption indication field and a retransmission of failed data may be sent before or after an acknowledgment signal from the UE indicating whether eMBB data was successfully decoded. In some embodiments, there are three potential cases:

|  | Case 1 | Case 2 | Case 3 |
|---|---|---|---|
| PI transmission | After ACK | Before ACK | Before ACK |
| Retransmission | After ACK | After ACK | Before ACK |

These different cases may be used in different embodiments and/or a given embodiment may support multiple cases (e.g., in different modes of operation or based on timing variations for different transmissions). In some embodiments, a base station is configured to operate using different modes for two or more of the timing cases discussed herein. For example, the base station may use different modes simultaneously for different UEs with different characteristics such as processing capabilities (e.g., some UEs may be slower to generate acknowledgement signaling). A given UE may be configured to operate using a single mode, or multiple modes, in some embodiments (e.g., using selecting between different modes depending on desired power consumption, delay, scheduling strategy, recovery strategy, etc.). As discussed above, PI may be encoded in the form of DCI through PDCCH and may be sent through a common or UE-specific search space.

Figure 9:
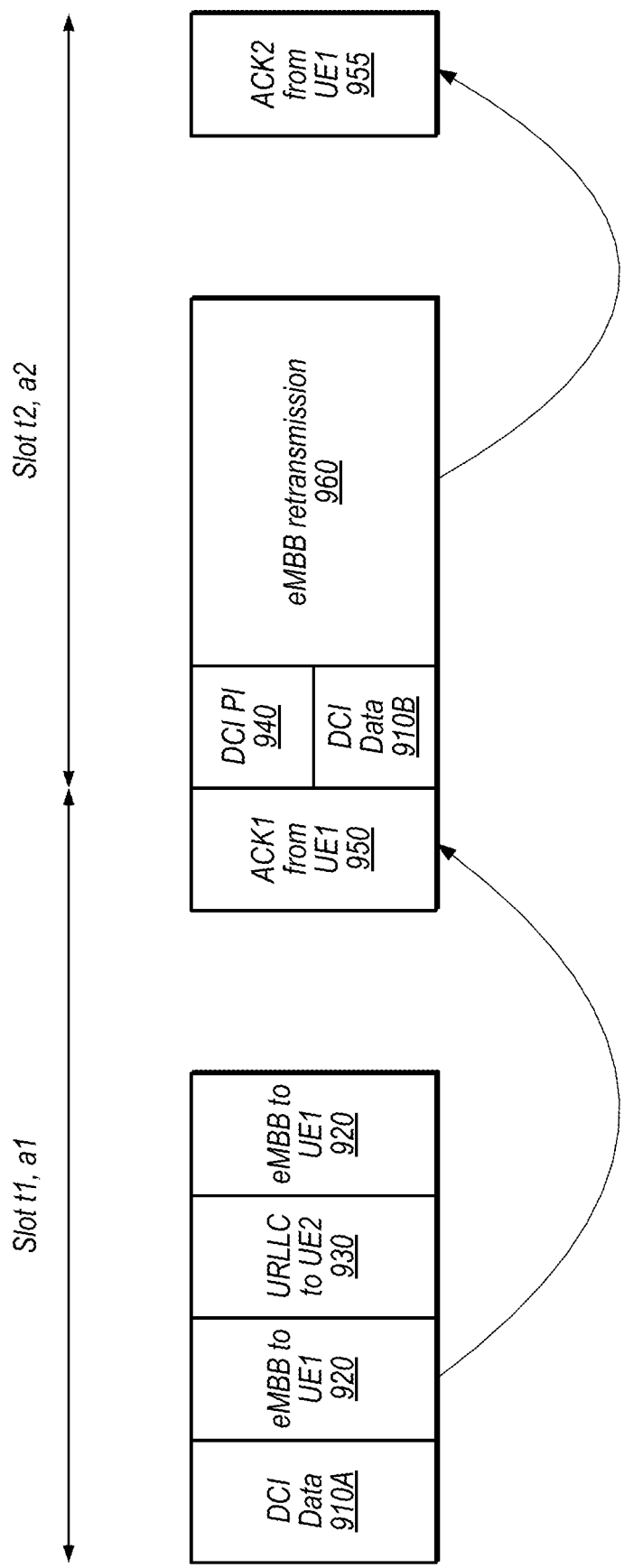
FIG. 9 is a diagram illustrating transmissions for a case in which a preemption indicator and retransmission are sent after receipt of acknowledgement signaling for the data being retransmitted, according to some embodiments.

FIG. 9 is a block diagram illustrating exemplary transmissions for case 1, according to some embodiments. In the illustrated embodiment, communications are performed using four slots: t1, a1, t2, and a2. In this illustrated example, t1 occurs before and/or during a1, a1 occurs before t2, and t2 occurs before and/or during a2. The "t" slots are used for transmissions by the base station while the "a" slots are used for acknowledgements from UE1, in the illustrated example.

For slot t1, in the illustrated embodiment, base station 102 transmits DCI data 910A, eMBB data to UE1 920, and a URLLC transmission to UE2 930 (where the URLLC transmission preempts the eMBB data to UE1 920 (note that the eMBB data may still be decodable by the UE, even in the presence of preemption).

In slot a1, in the illustrated embodiment, UE1 sends ACK1 950. ACK1 950, in the illustrated embodiment, specifies whether or not UE1 was able to successfully decode the eMBB data. As discussed above, ACK1 may be sent at a code block group granularity.

In the illustrated embodiment, base station 102 sends both the preemption indicator DCI PI 940 and the retransmission (eMBB retransmission 960) in slot t2 after receiving ACK1 950. In some embodiments, base station 102 is configured to retransmit only code block groups that were not successfully received in retransmission 960, based on the information in ACK1 950. In some embodiments, UE 106 is configured to attempt to decode DCI PI 940 only if it has a packet decoding failure (otherwise it may decode DCI data 910B and not DCI PI 940). DCI PI 940, in some embodiments, indicates code block groups (or some other granularity of resource) that was preempted. DCI PI 940 may be implemented according to any of the various descriptions herein of preemption indicators.

UE 106, in some embodiments, is configured to remove data (e.g., corresponding to certain code block groups) from its soft buffer (e.g., of log-likelihood ratio (LLR) data) based on DCI PI 940. It may also combine the retransmission data 960 with data in the buffer in an attempt to decode the data. In the illustrated embodiment, UE 106 then sends an ACK1 955 for the retransmission 960 in slot a2, which may indicate whether or not the retransmitted resources were successfully decoded. In the illustrated embodiment, DCI PI 940 may be UE-specific.

In some embodiments, DCI PI 940 and DCI data 910B may be used to convey at least partially overlapping data and therefore may be encoded in combination. For example, DCI data 910B may indicate code block groups that are included in retransmission 960, which may be the same code block groups that were preempted (although DCI data 910B may also indicate additional code block groups that failed due to reasons other than preemption by URLLC). Therefore, in some embodiments for case 1, DCI PI 940 may be a single bit that indicates whether at least one code block group in retransmission 960 was preempted. UE 106 may simply perform a combination operation in a soft buffer of the eMBB data and the retransmission when the DCI PI 940 bit indicates that preemption did not occur. When DCI PI 940 bit indicates that preemption occurred, in these embodiments, UE 106 may remove code block groups indicated by DCI data 910B from the soft buffer and combine the resulting buffer with the retransmission 960. This may occasionally result in removal of code block groups from the soft buffer when they were not actually preempted (e.g., because data may be retransmitted and indicated by DCI data 910B even when not preempted), but this potential disadvantage may be outweighed by the overall reduction in bits needed for preemption indicators, in some embodiments.

Figure 10:
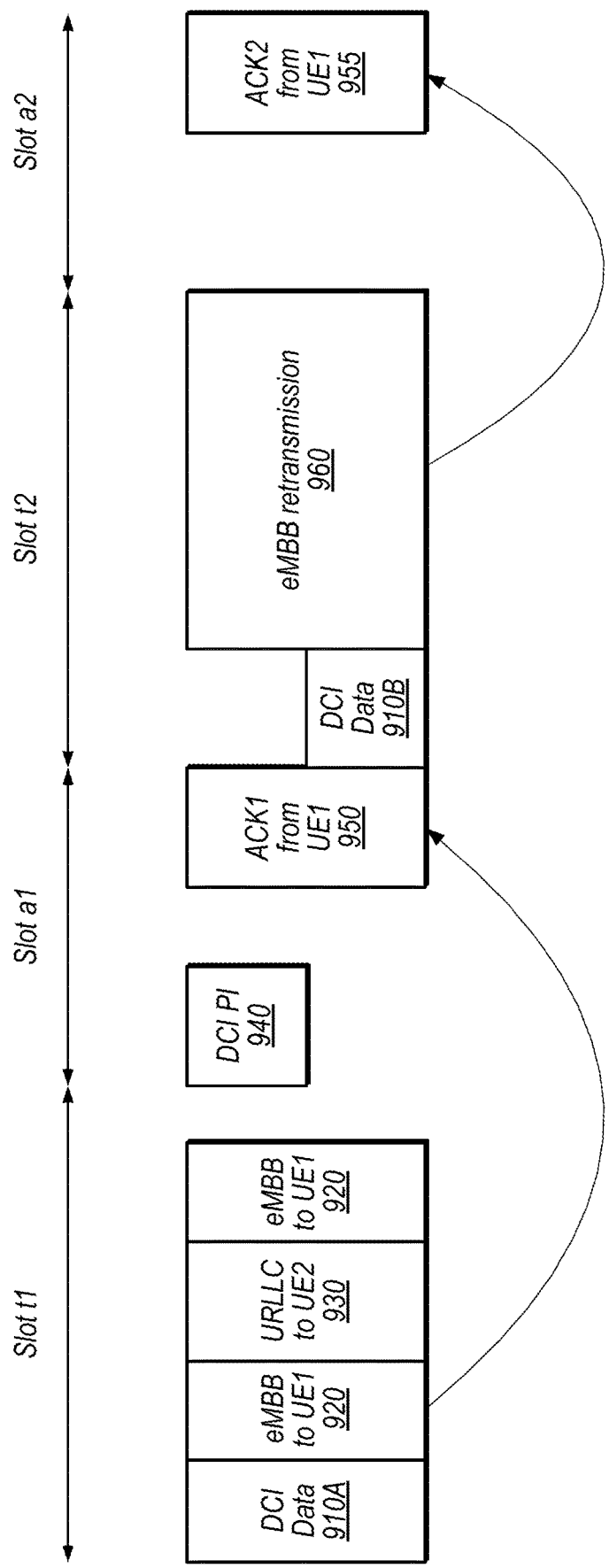
FIG. 10 is a diagram illustrating transmissions for a case in which a preemption indicator is sent prior to acknowledgment signaling for data being preempted and a retransmission is set after the acknowledgement signaling, according to some embodiments.

FIG. 10 is a block diagram illustrating exemplary transmissions for case 2, according to some embodiments. In the illustrated example, slot t1 occurs before slot a1, which occurs before slot t2. Slot a2 may occur during and/or after t2. In the illustrated example, the preemption indicator DCI PI 940 is sent before the ACK1 950 while the retransmission 960 is sent after. In some embodiments, DCI PI 940 is common to multiple UEs for case 2. In some embodiments, PI 940 does not use code block group granularity to indicate preempted data for case 2, given that different UEs may receive code block groups at different times.

Figure 12:
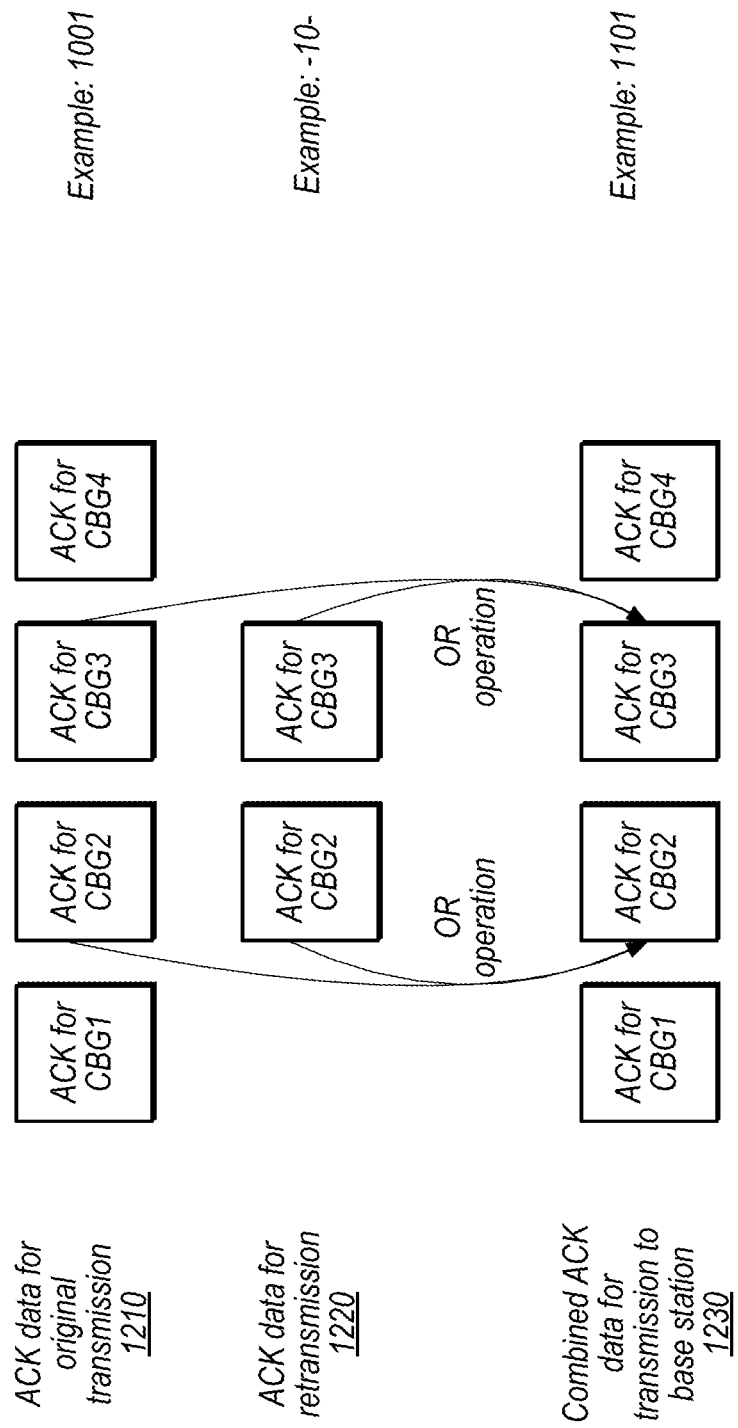
FIG. 12 is a diagram illustrating exemplary acknowledgement combining techniques, according to some embodiments.

In case 2, UE 106 may behave similarly to case 1, e.g., by attempting to decode DCI PI if it has a decoding failure. In this case, UE 106 may remove preempted data from a soft buffer and attempt to retry decoding, e.g., before sending ACK1 950. In some situations, UE 106 may need more time to retry decoding based on DCI PI 940. In some embodiments, UE 106 is configured to reschedule ACK1 to a later slot a1'. If a1' occurs after and/or during t2 and before and/or during a2, then the rescheduled ACK 1 may be combined with ACK2 (which may be further rescheduled to another slot after or during a2). FIG. 12, discussed in further detail below, illustrates exemplary techniques for ACK combining. Further, in some embodiments, ACK rescheduling may not be supported by base station 102 and/or UE 106. In these embodiments, the UE 106 may send multiple instances of ACK signaling.

In some embodiments, eMBB retransmission 960 may include only portions of a transport block that failed, based on the information in ACK1 950. ACK2 955 may indicate to the base station 102 which portions in retransmission 960 were successfully decoded by UE 106.

Figure 11:
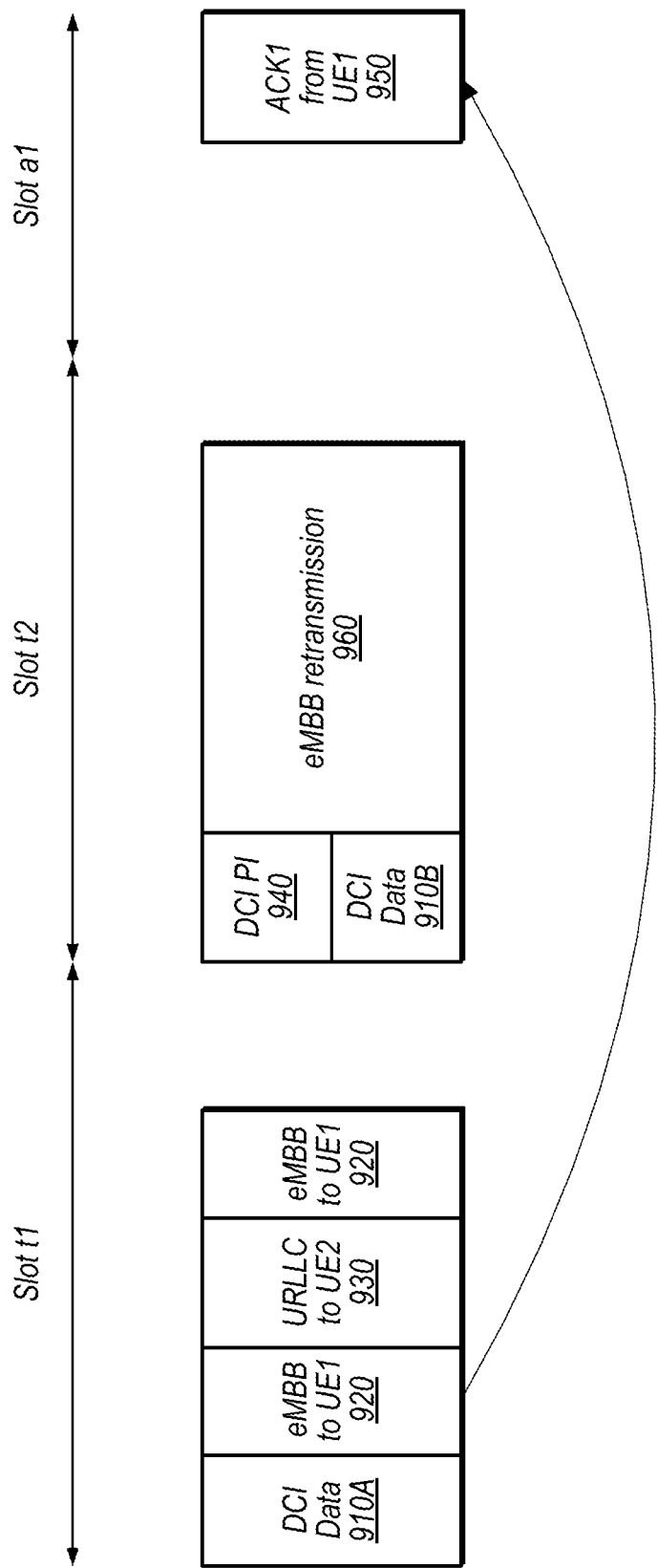
FIG. 11 is a diagram illustrating transmissions for a case in which a preemption indicator and retransmission are both sent prior to receipt of acknowledgement signaling, according to some embodiments.

FIG. 11 is a block diagram illustrating exemplary transmissions for case 3, according to some embodiments. In the illustrated example, both the DCI PI 940 and the retransmission 960 are sent before the ACK1 950 for the eMBB data that was preempted by URLLC transmission 930. Therefore, in this situation, the base station sends the retransmission before receiving any indication from UE 106 whether it successfully decoded the data. Therefore, base station 102 may simply retransmit code group blocks that were preempted, for example. As in case 1, DCI PI 940 and DCI data 910B may be encoded together, e.g., with a single bit for the preemption indicator. UE 106 may decode the DCI PI 940 only if it has a decoding failure, in some embodiments.

In some embodiments, UE 106 is configured to combine ACK 1 950 with an ACK for the retransmission (not explicitly shown). This may include rescheduling ACK 1 950 for a later slot than a1. In some embodiments, DCI PI 940 includes UE-specific information in case 3.

The techniques discussed with reference to case 3 may utilize more transmission energy than needed, e.g., when UE 106 was able to decode the eMBB data 920 without retransmission 960. In some embodiments, however, the delay may be shorter for case 3, relative to the other cases, e.g., because base station 102 need not wait for an ACK before sending the preemption indicator 940 and/or retransmission 960.

In various embodiments, the disclosed signaling for cases 1, 2, and/or 3 may enable URLLC preemption with efficient recovery of preempted eMBB data.

For the embodiments of FIGS. 9-11, a UE-specific DCI PI 940 may indicate, without limitation: CBG indices, OFDM symbol numbers, or mini-slot indices in the frequency dimension and sub-band number or PRB numbers in the time dimension. For these embodiments, a common DCI PI 940 may indicate, without limitation: OFDM symbol numbers or mini-slot indices in the frequency dimension and sub-band number or PRB numbers in the time dimension. In some embodiments, a common DCI PI 940 is transmitted in the new radio (NR)-PDCCH common search space or a group common PDCCH. In some embodiments, a UE-specific DCI PI 940 is transmitted in the NR-PDCCH UE-specific search space.

Exemplary Acknowledgement Combining

FIG. 12 is a block diagram illustrating exemplary acknowledgement data. In the illustrated example, ACK data for an original transmission 1210 include a signal (e.g., a bit) to indicate whether data for each of four code block groups was successfully decoded: CBG1, CBG2, CBG3, and CBG4. In the illustrated example, ACK data for a retransmission 1220 includes a separate ACK signal for CBG2 and CBG3 (only these two code block groups were retransmitted, e.g., based on preemption of these two code block groups). In the illustrated example, UE 106 is configured to combine the data 1210 and 1220 (e.g., using a logical OR operation) to generate combined ACK data for transmission to the base station 1230. Said another way, the combined acknowledgment signal is based on acknowledgement data for both the original transmission and the retransmission. UE 106 may reschedule the ACK for the original transmission in order to transmit a combined ACK.

The right-hand portion of FIG. 12 includes a particular example in which CBG1 and CBG4 are successfully decoded from the original transmission, but CBG2 and CBG3 are not. Thus, the ACK data 1210 is 1001 (binary) in this example, where a 1 indicates successful decoding. In the illustrated example, CBG2 is successfully decoded from the retransmission, but CBG3 is not. Therefore, the transmitted combined ACK data is 1101 (binary) in this example, by logically ORing the data 1210 and 1220. In this case, the base station 102 may send another retransmission of CBG3 (not explicitly shown).

Exemplary CBG-Based Retransmission Techniques

In some embodiments, code block group (CBG)-based acknowledgements for transmission or retransmission are used to recover packet data lost due to interference. These techniques may be performed alone or in combination with the one or more of the disclosed preemption indication techniques. In some embodiments, hybrid automatic repeat request (HARQ) techniques are used for retransmission and acknowledgement data includes a separate acknowledgement for each CBG. In some embodiments, ACKs are sent at the CBG granularity while a preemption indication is specified at code-block or symbol granularity.

The techniques discussed in detail below may be particularly effective in implementations of wireless systems with the characteristics discussed in this paragraph. In some implementations, a UE 106 is configured semi-statically based on RRC signaling from the base station that enables CBG-based retransmission. For example, once configured, a UE 106 may continue to use the configured CBG-based retransmission until it is reconfigured or disabled. In some implementations, the UE 106 is separately configured for uplink (UL) and downlink (DL) transmissions (e.g., CBG-based retransmission may be used for UL but not DL or vice versa and/or different CBG-based retransmission configurations may be used for UL and DL). In some implementations, CBG-based retransmission is only allowed for the same transport block (TB) of a HARQ process. In some implementations, a CBG is allowed to include all code blocks (CBs) of a TB, regardless of the size of the TB. In this case, the UE 106 may report a single HARQ ACK bit for the entire TB. In some implementations, a CBG is allowed to include a single CB. In some implementations the number of CBs in a CBG is configurable. In some implementations, one of three options for grouping CBs into CBGs are used. As a first option, the number of CBGs in a TB may be configured and the number of CBs in a CBG may vary based on the size of the TB. As a second option, the number of CBs per CBG may be configured and the number of CBGs may vary based on the size of the TB. As a third option, the number of CBGs and/or the number of CBs may be defined based on the TB size. CBGs may be approximately aligned with symbols. Other options for grouping CBs into CBGs may be implemented. In some implementations, the number of CBG HARQ ACK bits for a TB is at least equal to the number of CBGs indicated or implied for transmission. The UE may not need to transmit HARQ ACK bits for CBGs that are not indicated or implied for transmission. The indication or implication of CBGs may be performed using RRC signaling, MAC signaling, L1 signaling, or may be implicitly derived, for example. For DL CBG based (re)transmission, the DCI may include information indicating which CBGs are transmitted or retransmitted and how CBGs are to be handled for soft-buffer/HARQ combining (e.g., whether some of part of the soft buffer of indicated CBG(s) is flushed). In some implementations, the preemption indication indicates DL physical resources preempted and is transmitted using a PDCCH (and is not included in the DCI that schedules the transmission or retransmission of data). In some implementations, for a given number of CBGs for a given TB, the number of CBs per CBG should be as uniform as practicable. For example, the difference in number of CBs per CBG in the TB is either 0 or 1, in these implementations.

As used herein, the term "transport block" is intended to be interpreted according to its well-understood meaning, which includes: a block of data provided from an upper layer (e.g., a media access control (MAC) layer) of a wireless protocol to a physical layer of the wireless protocol. In some embodiments, a cyclic redundancy check (CRC) is appended to each transport block to provide error detection. In some embodiments, a transport block is generated for each transmission time interval (TTI). The size of transport blocks transmitted to a UE may be determined based on the amount of resources (e.g., resource blocks) assigned to the UE and the modulation and coding scheme, for example.

As used herein, the term "code block" is intended to be interpreted according to its well-understood meaning, which includes: a portion of a transport block which is encoded and error checked separately from other code blocks. A wireless communications standard may specify the maximum and minimum sizes for code blocks. E.g., in some LTE embodiments, the minimum code block size is 40 bits and the maximum code block size is 6114 bits.

As used herein, the term "code block group" refers to a set of one or more code blocks. In various embodiments, CBG-based HARQ involves transmitting HARQ acknowledgement signals at the CBG granularity.

As used herein, the term "OFDM symbol" is intended to be interpreted according to its well-understood meaning, which includes: a sequence of time domain samples at which a digital modulation scheme (e.g., QPSK, 16QAM, etc.) and IFFT is applied to a set of subcarriers. Symbols may carry any of various appropriate numbers of bits per symbol, which may be based on the selected modulation scheme.

The following description sets out exemplary techniques for determining parameters for CBG-based transmissions and retransmissions, including a current maximum number of CBGs for a given UE N_CBG_max, a transport block size TBS, a number of code blocks per transport block N_CB, a number of code block groups N_CBG, and grouping of CBs.

In some embodiments, a parameter N_CBG_max indicates the maximum number of CBGs per transport block for a given UE/base station pair. This parameter may depend on UE geometry, e.g., this parameter may relate to signal to interference plus noise ratio (SINR) for the UE and may be larger with a better SINR. The number of distinct ACKs supported may also be limited by the capacity of the corresponding PUCCH channel. Also, if carrier aggregation is enabled, ACKs from multiple carriers may be multiplexed into a single PUCCH in one UL carrier, which may limit the N_CBG_max per DL carrier. Therefore, in some embodiments, the base station is configured to select N_CBG_max (and may indicate this parameter to the UE using RRC signaling) based on various factors, including without limitation: channel conditions reported by the UE, PUCCH capacity, whether carrier aggregation is enabled, etc.

In some embodiments, the base station is configured to determine transport block size (TBS) based on a modulation and coding scheme, e.g., as specified by a modulation and coding scheme index (I_MCS) in combination with an amount of time-frequency resources allocated to the UE. These parameters may be determined based on channel quality index (CQI) measurements, for example. In some embodiments, the TBS may be determined indirectly, e.g., determining a TBS index I_TBS based on I_MCS and then determining the transport block size based on I_TBS and the allocated resources.

In some embodiments, one or more of multiple techniques may be implemented for determining the number of CBs per TB: N_CB. In some embodiments, a single technique is used for a given system, while in other embodiments a communications system may be configured to select from among multiple techniques for determining this parameter.

Figure 13A:
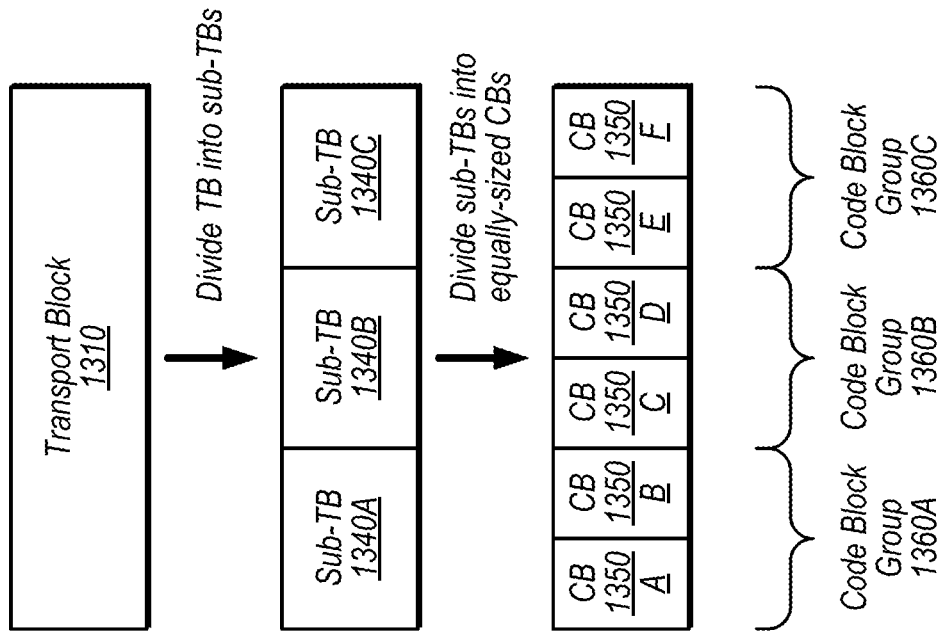
FIGS. 13A-13B are diagrams illustrating techniques to determine the number of code blocks in a transport block and grouping the code blocks into code block groups, according to some embodiments.

A first technique, according to some embodiments, involves selecting N_CB to make CB size equal or nearly equal. FIG. 13A illustrates an exemplary application of this first technique. A transport block 1310 is split into a plurality of roughly equal code blocks 1320 based on the TB size (note that the CBs may not be exactly equal, e.g., if the TBS is an odd number then CB sizes may differ by a bit). These CBs 1320 are then grouped into code block groups 1330 (in the illustrated embodiment, CBs 1320A and 1320B are included in CBG 1330A, while CBGs 1330B and 1330C each include a single CB). This approach may avoid complexity, but may cause CBGs with different numbers of CBs, as shown in the illustrated example. This in turn may cause difficulty in aligning CBGs with symbols.

Figure 13B:
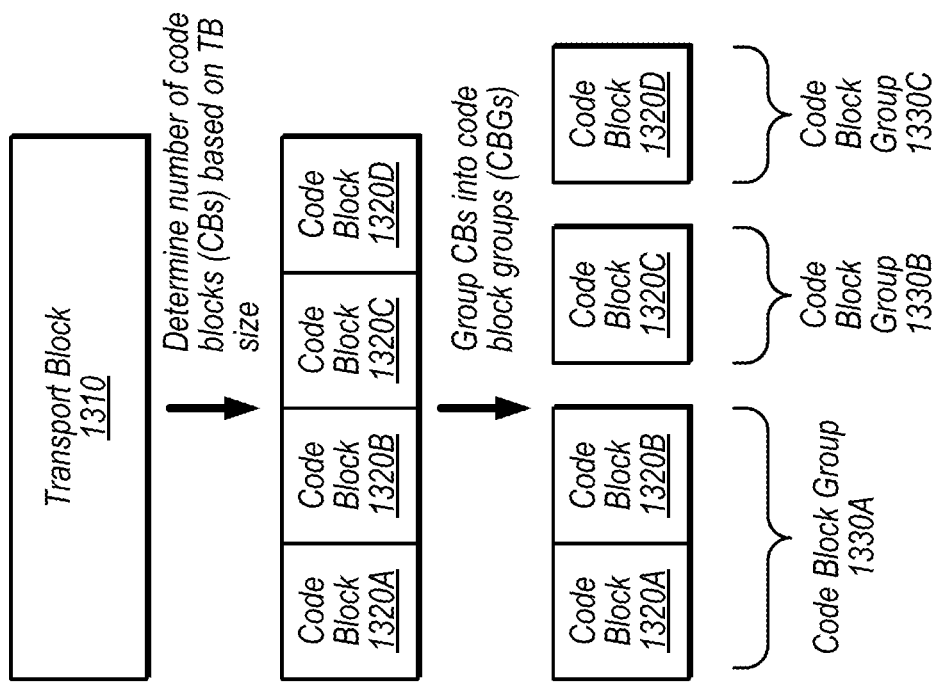

A second technique, according to some embodiments, involves selecting N_CB to make the CBG size roughly equal. FIG. 13B illustrates an exemplary application of this second technique. In this example, a transport block 1310 is divided into sub-TBs 1340 that are roughly equal in size. These sub-TBs are then divided into roughly-equal-sized CBs 1350, which are then grouped into CBGs 1360. This second technique may have slightly lower performance than the first technique, by may allow aligned CBGs which may facilitate localizing regions where failures/preemption occurred.

As discussed above, an ACK signal may be indicate whether each CBG was successfully decoded for a given transmission or retransmission.

In some embodiments, one or more of multiple techniques may be implemented for determining the number of CBGs per TB: N_CBG. A first technique for the base station is to arbitrarily choose a number that is smaller than or equal to N_CBG_max. The base station may signal the chosen value to the UE through DCI signaling, for example. A second technique is to select the greatest N_CBG usable for a given situation. In this second technique, the base station is configured to set N_CBG to N_CB if N_CB is smaller than N_CBG_max and set N_CBG to N_CBG_max otherwise. A third technique is to use a fallback technique (e.g., a TB-based ACK) for small N_CB, such that if N_CB does not meet a threshold, the base station sets N_CBG to 1, but is configured to set N_CBG to N_CBG_max if N_CB meets the threshold. The base station may be configured to specify the threshold using RRC signaling, for example. A fourth technique is to set N_CBG to the lesser of N_CBG_max and the number of symbols in the first transmission and then select N_CB to make the CBG size roughly equal (e.g., as shown in FIG. 13B). This may facilitate alignment of CBGs with OFDM symbols. In this fourth technique, the N_CBG parameter is determined first, prior to N_CB.

FIGS. 14A-14B are diagrams illustrating exemplary CB grouping techniques. In some embodiments, if N_CBG=1 then all CBs belong to one CBG and if N_CBG=N_CB then each CBG includes only one CB. In some embodiments, if N_CBG is smaller than N_CB one of two techniques is implemented. In a first technique, the base station chooses a number of CBs for each CBG such that the CBGs are as uniform as possible. For example, this is shown for three CBGs in FIG. 14A and for four CBGs in FIG. 14B for four symbols. As shown in FIG. 14A, this may cause CBGs not to be aligned with symbol boundaries (e.g., CBG 2 occupies parts of the second and third symbols in the illustrated example and does not begin or end at a symbol boundary).

In a second technique, the base station is configured to distribute CBs according to a ratio that is determined based on factors such as N_CBGs, the number of FDM symbols, the number of physical resource blocks (PRBs), etc. FIG. 14C illustrates such a non-uniform grouping of CBs per CBG with a ratio of 1:1:2 for CBGs 1, 2, and 3. As shown, this grouping may provide better alignment of CBGs with symbols, relative to the grouping of FIG. 14A.

Note that a given CBG or CB may correspond to a greater number of symbols than shown in FIGS. 14A-14C, these figures are included for purposes of illustration of symbol boundaries and aligning CBGs, but are not intended to limit the scope of the present disclosure.

Figure 15:
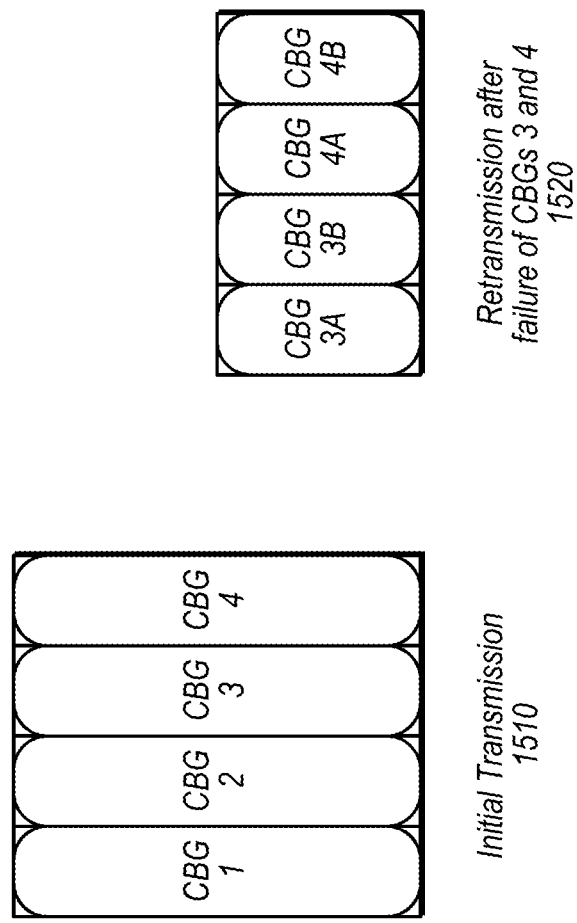
FIG. 15 illustrates exemplary techniques for regrouping code blocks into code block groups for a retransmission, according to some embodiments.

In some embodiments, the base station is configured to regroup CBs in certain retransmission situations. FIG. 15 shows an exemplary regrouping, according to some embodiments. The base stations transmits four CBGs 1-4 in an initial transmission 1510. In the illustrated example, CBGs 3 and 4 fail (e.g., as indicated by negative ACK signaling for those CBGs from UE 106). In the illustrated embodiment, the base station is configured to regroup the CBs in CBGs 3 and 4 from the original transmission. In particular, the base station splits CBs from CBG 3 into two CBGs 3A and 3B that each include a lesser number of CBs than CBG 3 in the retransmission 1520. Similarly, the base station splits CBs from CBG 4 into two CBGs 4A and 4B that each include a lesser number of CBs than CBG 4, in the illustrated example. Regrouping in this manner may provide better resolution to determine the location of an error, and may utilize communication between the base station and UE to indicate that regrouping occurred.

Although the CBs from two CBGs are regrouped into four CBGs in the illustrated example, the example is not intended to limit the scope of the present disclosure; any of various regrouping techniques may be implemented (e.g., the CBs of a CBG may be split into 3, 4, or any appropriate number of CBGs). Further, CBs from multiple CBGs could also be grouped into a single CBG for retransmission, in some embodiments, although this may reduce resolution in detecting error location.

In some embodiments, various information may be included in DCI for CBG-based (re)transmission. This may include a HARQ process identifier (PID), a new data indicator (which may be toggled for a new TB transmission), resource allocation information (which may specify time-frequency resources assigned for transmission, e.g., in units of PRBs and OFDM symbols), I_MCS, a redundancy version (which may be common to all CBGs in a TB or CBG-specific), a CRG bitmap, and/or soft handling information bit(s).

The base station may use the CBG bitmap to indicate which CBG is transmitted. In some embodiments, the length of the bitmap is equal to the N_CBG_max that is configured through RRC signaling, which may avoid dynamically changing the size of DCI once semi-statically configured (note that dynamically changing the size of DCI may increase blind decoding by the UE). In the original transmission, all the bits in the bitmap are set, in some embodiments, while bits for CBGs that have been successfully received and are not retransmitted may not be set for retransmissions. In some embodiments, the UE may use the number of bits set in the CBG bitmap for the initial transmission to determine the number of CBGs in the TB. In other embodiments, the UE may determine the number of CBGs in a TB based on one or more predefined rules, e.g., based on TBS, N_CBG_max, etc.

The soft buffer handling information may indicate whether CBGs need special handling (e.g., based on URLLC preemption) and is a type of UE-specific PI (which may be used in combination with common PI information that is not based on CBG). For example, the base station may use this information to inform the UE that it should not combine a CBG with previously-determined soft-bit information, due to preemption by URLLC that causes corruption of the soft buffer. In this case, the UE may be configured to remove all soft bits corresponding to indicated CBGs and store newly received soft bits. Otherwise, the UE may be configured to combine data from the retransmission with data in the soft buffer. In some embodiments, a common bit is used for multiple CBGs and indicates that all CBGs that are indicated as being transmitted (e.g., by the CBG bitmap) need special handling for soft-combining. In some embodiments, CBG-specific bits are used to indicate CBGs that need special handling for soft buffer combining, which may use N_CBG_max bits but may provide finer granularity relative to a common bit. Soft-buffer processing may also be affected by preemption indications, as discussed in further detail below.

In some embodiments, the UE is configured to remove only a portion of soft bit information for impacted CBGs. For example, if the soft buffer already combines data from multiple transmissions with different RV values, the UE may be configured to remove soft buffer information for only the previous RV (corresponding to the CBGs indicated as impacted) and combine them with newly received soft bits.

In some embodiments, one or more of multiple techniques may be implemented for determining ACK codebook length. As a first technique, ACK length has a dynamic size. In this first option, ACK bits are non-cumulative and only ACK bits corresponding to the CBGs indicated for transmission are included. This may reduce feedback overhead.

As a second technique, the ACK length has a fixed size of N_CBG for a given TB. In some embodiments, the ACK bits are cumulative, such that all CBG ACK bits are included in a given ACK packet and the length does not change during a given TB. This may provide higher reliability, relative to the first technique, and may not have error propagation. All zeros or all ones in the ACK packet may be used as a TB-level ACK indication. For example, all ones in the ACK packet may indicate success of the TB while all zeros may indicate failure of the TB even after multiple retransmissions (e.g., based on the UE determining that a CRC check for the TB failed) and that the TB should be re-scheduled by the base station.

As a third technique, the ACK length has a fixed size of N_CBG_max across all TBs, such that all CBG ACK bits are included in a given ACK packet (although only N_CBG bits will actually be used for a given TB). In some embodiments, the remaining bits, when N_CBG is less than N_CBG_max, may be used for other signaling, e.g., a TB-level ACK.

In the first and second techniques, in some embodiments, a base station may rely on the latest ACK status when there is a conflict between bits of different ACKs for different (re)transmissions. In other embodiments, any of various appropriate techniques may be implemented for handling conflicts, using a predetermined rule.

In some embodiments, both a PI and CBG-based HARQ information may be used to determine time and/or frequencies resources impacted by a preempting (e.g., a URLLC) transmission. For example, the PI may specify one or more OFDM symbols preempted (and the PI may be common to multiple UEs) and CBG-based DCI may indicate CBGs that were retransmitted. The combination of this information may enable the UE to identify symbols/PRBs that were affected by URLLC and appropriately remove or combine data from a soft buffer. For example, if a CBG with two symbols was retransmitted (which may be determined based on the CBG bitmap in DCI), and the PI indicates that preemption occurred for the first symbol and not the second, the UE may be configured to combine soft bit information for the original transmission and the retransmission for the second symbol but discard soft-bit information for the original transmission for the first symbol.

Note that, although CBG-based transmissions are primarily discussed for downlink transmission here, similar techniques may be utilized for uplink transmissions. Therefore, any functionality described herein as performed by the base station for downlink transmissions may be performed by the UE for uplink transmissions and vice versa.

Exemplary Method

FIG. 16A is a flow diagram illustrating a method for CBG-based acknowledgements, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1610, in the illustrated embodiment, a base station determines, for a transport block of data to be transmitted, a number of code blocks in the transport block and a number of code block groups. The number of blocks and groups may each be greater than one.

At 1620, in the illustrated embodiment, the base station sends information, to a user device, that indicates the number of code blocks and number of code block groups to a user device.

At 1630, in the illustrated embodiment, the base station transmits the transport block to the user device.

At 1640, in the illustrated embodiment, the base station received acknowledgement information from the user device that indicates, for each code block group of the transport block, whether the code block group was successfully decoded by the user device.

In some embodiments, the method of FIG. 16A includes the method of FIG. 16B, which includes, at 1650, transmitting a preemption indicator that indicates a portion of the transport block preempted by another data service, wherein the preemption indicator is specified at a different granularity than a code block group.

Exemplary Embodiments

In some embodiments, an apparatus, comprises: one or more processing elements configured to processed received wireless data, including to: in response to failing to decode data for a first data service, detect a preemption indicator, wherein the preemption indicator indicates a set of resources in which a second data service preempted the first data service; in response to detecting the preemption indicator, decode the preemption indicator to determine the set of resources and remove data associated with the indicated set of resources from a data buffer; and re-try decoding of the data for the first data service after removal of the data associated with the indicated set of resources.

In some embodiments, the first data service is an enhanced mobile broadband (eMBB) service and the second data service is an ultra reliable low latency (URLLC) service.

In some embodiments, the preemption indicator specifies the set of resources in both the time dimension and the frequency dimension.

In some embodiments, the preemption indicator includes a first portion that is transmitted at the same time as the preemption and indicates a time in which preemption is occurring and a second portion that is not transmitted at the time in which preemption occurs and indicates frequency resources in which the preemption occurred.

In some embodiments, the first portion is common to multiple mobile device and the second portion is specific to the apparatus.

In some embodiments, the preemption indicator is transmitted after the preemption has occurred.

In some embodiments, the preemption indicator is transmitted concurrently with the preemption data for the second data service.

In some embodiments, the second data service has a lower latency requirement than the first data service.

In some embodiments, the preemption indicator indicates time resources using at least one of the following granularities: orthogonal frequency division multiplexing (OFDM) symbol; code block; code block group; or mini-slot.

In some embodiments, the preemption indicator indicates frequency resources using at least one of the following granularities: physical resource block (PRB); sub-band; or subcarrier.

In some embodiments, the preemption indicator indicates a location of a control channel used to schedule the preempting data for the second data service.

In some embodiments, an apparatus, comprises: one or more processing elements configured to process received wireless data, including to: receive information indicating a set of time and frequency resources in which preemption of a first data service by a second data service is permitted; in response to failing to decode received data transmitted using the set of time and frequency resources, retry decoding based on a preemption indicator (PI) that specifies particular time and frequency resources preempted within the set of time and frequency resources; and in response to failing to decode received data transmitted using other time and frequency resources that are not in the set of time and frequency resources, sending a message indicating failure to a base station without attempting to retry decoding the received data.

In some embodiments, at least a portion of the information is received in radio resource control (RRC) signaling.

In some embodiments, at least a portion of the information is received in downlink control information (DCI).

In some embodiments, at least a portion of the information is received in a dedicated sub-band.

In some embodiments, the information indicates frequency resources using at least one of the following granularities: physical resource block (PRB) or sub-band indices.

In some embodiments, the information indicates time resources using at least one of the following granularities: OFDM symbol, mini-slot, slot, subframe, or frame.

In some embodiments, an apparatus comprises: one or more processing elements configured to: cause wireless data to be transmitted for a first data service; in response to receiving data to be transmitted for a second data service during a scheduled transmission interval for the first data service: determine a set of time and frequency resources in which preemption of the first data service is permitted, based on prior communications; transmit data for the second data service during the scheduled transmission interval; and transmit a preemption indicator that specifies a set of time and frequency resources in which data for the second data service was transmitted.

In some embodiments, an apparatus comprises: one or more processing elements configured to: cause wireless data to be transmitted for a first data service; in response to receiving data to be transmitted for a second data service during a scheduled transmission interval for the first data service, send, subsequent to receipt of an acknowledgement signal for the scheduled transmission interval for the first data service: a preemption indicator that specifies a set of radio resources in which data for the second data service was transmitted during the scheduled transmission interval; and a retransmission of preempted data for the first data service that was scheduled to be transmitted using at least a portion of the set of radio resources.

In some embodiments, the apparatus is configured not to retransmit a portion of the preempted data that in response to determining that the acknowledgment signal indicates the portion as successfully decoded.

In some embodiments, the acknowledgement signal includes separate signaling for each of multiple different portions of a transport block for the first data service and the retransmission includes only failed portions of the transport block indicated by the acknowledgement signal.

In some embodiments, the different portions are code block groups.

In some embodiments, the preemption indicator is encoded in combination with downlink control information for the retransmission.

In some embodiments, the preemption indicator specifies the set of radio resources indirectly by indicating that at least at portion of the retransmitted data indicated by the downlink control information was preempted.

In some embodiments, the preemption indicator is a single bit.

In some embodiments, the preemption indicator is UE-specific and specifies at least one of code block groups, orthogonal frequency-division multiplexing (OFDM) symbols, or mini-slots in the time domain and at least one of sub-bands and physical resource blocks (PRBs) numbers in the frequency domain.

In some embodiments, a mobile device is configured to remove data for the set of radio resources from a soft buffer and add data from the retransmission to the soft buffer based on the preemption indicator.

In some embodiments, an apparatus comprises: one or more processing elements configured to: cause wireless data to be transmitted for a first data service; in response to receiving data to be transmitted for a second data service during a scheduled transmission interval for the first data service: send, prior to receipt of an acknowledgement signal for the scheduled transmission interval for the first data service, a preemption indicator that specifies a set of radio resources in which data for the second data service was transmitted during the scheduled transmission interval; and send, subsequent to receipt of the acknowledgement signal, a retransmission of data for the first data service that was scheduled to be transmitted using at least a portion of the set of radio resources.

In some embodiments, the preemption indicator is common to multiple mobile devices.

In some embodiments, the apparatus is configured not to retransmit a portion of the preempted data that in response to determining that the acknowledgment signal indicates the portion as successfully decoded.

In some embodiments, in response to rescheduling of the acknowledgement signal by a mobile device, the apparatus is configured to send the retransmission prior to the rescheduled acknowledgement signal, wherein the mobile device reschedules the acknowledgment signal based on the preemption indicator.

In some embodiments, the apparatus is configured to receive the rescheduled acknowledgement signal and wherein the rescheduled acknowledgement signal combines acknowledgement data for the scheduled transmission interval and acknowledgement data for the retransmission.

In some embodiments, an apparatus comprises: one or more processing elements configured to: cause wireless data to be transmitted for a first data service; in response to receiving data to be transmitted for a second data service during a scheduled transmission interval for the first data service, send, prior to receipt of an acknowledgement signal for the scheduled transmission interval for the first data service: a preemption indicator that specifies a set of radio resources in which data for the second data service was transmitted during the scheduled transmission interval; and a retransmission of data for the first data service that was scheduled to be transmitted using at least a portion of the set of radio resources.

In some embodiments, the apparatus is configured to send the retransmission based on detecting preemption prior to receiving any acknowledgement from a mobile device to indicate whether the retransmission data was successfully decoded prior to the retransmission.

In some embodiments, the preemption indicator is UE-specific.

In some embodiments, the preemption indicator is encoded in combination with downlink control information for the retransmission.

In some embodiments, the preemption indicator specifies the set of radio resources indirectly by indicating that at least at portion of the retransmitted data indicated by the downlink control information was preempted.

In some embodiments, the apparatus is configured to receive the acknowledgement signal and the acknowledgement signal includes combined acknowledgement data for the scheduled transmission interval and the retransmission.

In some embodiments, the acknowledgement signal for the scheduled transmission interval is rescheduled.

In some embodiments, an apparatus is configured to operate in a plurality of different modes corresponding to the functionality described in the previous embodiments. In some embodiments, the apparatus is configured to use different modes in parallel for communications with different mobile devices based on capabilities of the different mobile devices, a power requirement, a delay requirement, a scheduling strategy, or a recovery strategy.

In some embodiments, an apparatus comprises: one or more processing elements configured to: receive wireless data from a base station for a first data service; receive a preemption indicator from a base station, wherein the preemption indicator specifies a set of radio resources in which data for a second data service was transmitted during a scheduled transmission interval for the first data service; receive, from the base station, a retransmission of at least a portion of the data for the first data service corresponding to the scheduled transmission interval; remove preempted data from a soft buffer of received data based on the preemption indicator; and combine data from the retransmission with data in the soft buffer after removing the preempted data.

In some embodiments, the apparatus is configured to send an acknowledgement signal that indicates whether different portions of the data for the first data service during the scheduled transmission interval was received.

In some embodiments, the apparatus is configured to receive the preemption indicator and the retransmission subsequent to sending the acknowledgement signal.

In some embodiments, the apparatus is configured to receive the preemption indicator prior to sending the acknowledgement signal and configured to receive the retransmission subsequent to sending the acknowledgement signal.

In some embodiments, the apparatus is configured to reschedule the acknowledgement signal and combine acknowledgement data for the scheduled transmission interval and the retransmission in the rescheduled acknowledgement signal.

In some embodiments, the retransmission includes only data portions during the scheduled transmission interval which the acknowledgement signal indicates were not successfully decoded.

In some embodiments, the apparatus is configured to receive the preemption indicator and the retransmission prior to sending the acknowledgement signal.

In some embodiments, the apparatus is configured to combine acknowledgement data for the scheduled transmission interval and the retransmission in the acknowledgement signal.

In some embodiments, the apparatus is configured to determine preempted resources during the scheduled transmission earlier based on both the preemption indicator and received downlink control information in combination.

In some embodiments, an apparatus, an apparatus configured to operate according to a plurality of modes including modes corresponding to two of more of the previous embodiments, and the apparatus is configured to select between the plurality of modes based on power characteristics of the apparatus.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, an apparatus comprises means for performing one or more of the method elements of FIG. 7.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processing elements configured to:
   receive first downlink control information (DCI) in a physical downlink control channel (PDCCH) corresponding to a downlink packet transmission;

receive the downlink packet transmission associated with the first DCI in a set of resources indicated by the first DCI, wherein the packet transmission comprises:
- a number of code blocks, wherein the number of code blocks in a transport block is greater than or equal to one; and
- a number of code block groups, wherein the number of code blocks per code block group is greater than or equal to one; and attempt decoding of the packet transmission based on the first DCI, wherein the first DCI includes:
- a field indicating which code block groups are transmitted; and
- soft buffer handling information that indicates whether to flush previously-determined soft bits that correspond to one or more code block groups.

2. The apparatus of claim 1, wherein the soft buffer handling information includes a field that indicates whether to flush previously-determined soft bits for multiple code block groups.

3. The apparatus of claim 2, wherein the field of the soft buffer handling information indicates whether to flush soft bits that correspond to retransmitted code block groups in the downlink packet transmission.

4. The apparatus of claim 1, wherein the soft buffer handling information includes a field per code block group that indicates whether to flush previously-determined soft bits for that code block group.

5. The apparatus of claim 1, where the one or more processing elements are further configured to:
receive, in a radio resource configuration (RRC) message, a configuration of a maximum number of code block groups for wireless communications, wherein a size of the field indicating which code block groups are transmitted corresponds to the maximum number of code block groups.

6. The apparatus of claim 1, wherein the downlink packet transmission is a retransmission of the transport block that includes a subset of code block groups of an original transmission to which the retransmission corresponds.

7. The apparatus of claim 1, wherein one or more processing elements are further configured to:
receive a second RRC message that indicates that preemption is allowed; and
based on the second RRC indication, receive a preemption indication (PI) in second DCI in the PDCCH, wherein the second DCI is common to multiple user equipment devices, wherein the PI indicates a portion of a transmission in a physical layer frame that is preempted, wherein the second DCI indicates at least time resources that are preempted.

8. The apparatus of claim 7, wherein the second DCI further indicates frequency resources that are preempted by the PI.

9. The apparatus of claim 7, wherein the apparatus is configured to attempt decoding of the packet transmission prior to receiving the second DCI, and in response to unsuccessful decoding, attempt decoding of the second DCI.

10. The apparatus of claim 1, wherein the apparatus is configured to send acknowledgement signals at code block group granularity and wherein the apparatus is configured to logically combine acknowledgements for multiple ones of an original transmissions or one or more retransmissions using a single field.

11. The apparatus of claim 1, wherein the apparatus is a user equipment device that includes one or more radios and one or more antennas.

12. An apparatus, comprising:
one or more processing elements configured to:
transmit first downlink control information (DCI) in a physical downlink control channel (PDCCH) corresponding to a downlink packet transmission;
transmit the downlink packet transmission associated with the first DCI in a set of resources indicated by the first DCI, wherein the packet transmission comprises:
- a number of code blocks, wherein the number of code blocks in a transport block is greater than or equal to one; and
- a number of code block groups, wherein the number of code blocks per code block group is greater than or equal to one; and wherein the first DCI includes:
- a field indicating which code block groups are transmitted; and
- soft buffer handling information that indicates whether to flush previously-determined soft bits that correspond to one or more code block groups.

13. The apparatus of claim 12, wherein the soft buffer handling information includes a field that indicates whether to flush previously-determined soft bits for multiple code block groups.

14. The apparatus of claim 13, wherein the field of the soft buffer handling information indicates whether to flush soft bits that correspond to retransmitted code block groups in the downlink packet transmission.

15. The apparatus of claim 12, wherein the soft buffer handling information includes a field per code block group that indicates whether to flush previously-determined soft bits for that code block group.

16. The apparatus of claim 12, wherein one or more processing elements are further configured to:
transmit a second RRC message that indicates that preemption is allowed; and
based on the second RRC indication, transmit a preemption indication (PI) in second DCI in the PDCCH, wherein the second DCI is common to multiple user equipment devices, wherein the PI indicates a portion of a transmission in a physical layer frame that is preempted, wherein the second DCI indicates at least time resources that are preempted.

17. The apparatus of claim 16, wherein the second DCI further indicates frequency resources that are preempted by the PI.

18. A non-transitory computer-readable medium having instructions stored thereon that are executable by a computing device to perform operations comprising:
receiving first downlink control information (DCI) in a physical downlink control channel (PDCCH) corresponding to a downlink packet transmission;
receiving the downlink packet transmission associated with the first DCI in a set of resources indicated by the first DCI, wherein the packet transmission comprises:
- a number of code blocks, wherein the number of code blocks in a transport block is greater than or equal to one; and
- a number of code block groups, wherein the number of code blocks per code block group is greater than or equal to one; and attempting to decode the packet transmission based on the first DCI, wherein the first DCI includes:

a field indicating which code block groups are transmitted; and soft buffer handling information that indicates whether to flush previously-determined soft bits that correspond to one or more code block groups.

19. The non-transitory computer-readable medium of claim 18, wherein the soft buffer handling information includes a field that indicates whether to flush previously-determined soft bits for multiple code block groups.

20. The non-transitory computer-readable medium of claim 19, wherein the field of the soft buffer handling information indicates whether to flush soft bits that correspond to retransmitted code block groups in the downlink packet transmission.

\* \* \* \* \*